United States Patent
Kukura et al.

(10) Patent No.: US 6,633,923 B1
(45) Date of Patent: Oct. 14, 2003

(54) METHOD AND SYSTEM FOR DYNAMIC CONFIGURATION OF INTERCEPTORS IN A CLIENT-SERVER ENVIRONMENT

(75) Inventors: Robert A Kukura, Sudbury, MA (US); Ryan Craig, Naas (IE); Matthew A Mihic, Cambridge, MA (US)

(73) Assignee: IONA Technologies Inc., Dublin (IE)

(*) Notice: Subject to any disclaimer, the term of this patent is extended or adjusted under 35 U.S.C. 154(b) by 0 days.

(21) Appl. No.: 09/890,443

(22) PCT Filed: Jan. 28, 2000

(86) PCT No.: PCT/US00/02189

§ 371 (c)(1),
(2), (4) Date: Dec. 18, 2001

(87) PCT Pub. No.: WO00/45256

PCT Pub. Date: Aug. 3, 2000

Related U.S. Application Data

(60) Provisional application No. 60/117,938, filed on Jan. 29, 1999, provisional application No. 60/117,950, filed on Jan. 29, 1999, provisional application No. 60/117,946, filed on Jan. 29, 1999, and provisional application No. 60/117,944, filed on Jan. 29, 1999.

(51) Int. Cl.$^7$ .................................................. G06F 9/54
(52) U.S. Cl. ...................................... 709/316; 709/203
(58) Field of Search ................................ 709/310–320, 709/328–332, 203

(56) References Cited

U.S. PATENT DOCUMENTS

| | | | | |
|---|---|---|---|---|
| 6,141,686 A | * | 10/2000 | Jackowski et al. | 709/224 |
| 6,279,001 B1 | * | 8/2001 | DeBettencourt et al. | 707/10 |
| 6,314,463 B1 | * | 11/2001 | Abbott et al. | 709/224 |
| 6,317,786 B1 | * | 11/2001 | Yamane et al. | 709/224 |
| 6,330,677 B1 | * | 12/2001 | Madoukh | 713/200 |
| 6,453,320 B1 | * | 9/2002 | Kukura et al. | 707/103 |

OTHER PUBLICATIONS (no author given), "CORBA Security Draft", OMG Document No. 95–91, pp. 161–178, Sep., 1995.*

Sedgewick, Robert, "Algorithms in C", Addison–Wesley Publishing Company, pp. 17–25, 51–53, 1990.*

(no author given), "ORB Interoperability", ICL Submission to the OMG Object Request Broker 2.0 Request for Proposals, OMG Document 94.3.3, pp. 1–55, Mar., 7, 1994.*

No Author Given) CORBA Security, OMG Document No. 95–12–1, Dec. 1995, pp. 160–166, especially pp. 160 and 162.

International Search Report.

* cited by examiner

Primary Examiner—St. John Courtenay, III
(74) Attorney, Agent, or Firm—Lacasse & Associates, LLC

(57) ABSTRACT

A computer implemented method of creating and managing one or more interceptors. The method comprises the steps of intrinsically chaining the interceptors, and storing state information, in at least one of the chained interceptors, directed to a reference to the next interceptor. A server computer in a client-server environment that includes a processor configured to generate one or more interceptors and to intriscally chain the interceptors, and a memory associated with at least one of the chained interceptors and configured to store state information directed to a reference to the next interceptor thereof.

4 Claims, 3 Drawing Sheets

THE ENCODED LENGTH OF THIS SEGMENT IS 10 OCTETS – NINE FOR THE DATA PLUS ONE FOR THE DATA LENGTH FIELD

METHOD AND SYSTEM FOR DYNAMIC CONFIGURATION OF INTERCEPTORS IN A CLIENT-SERVER ENVIRONMENT

This application claims the benefit of provisional applications Nos. 60/117,938, 60/117,950, 60/117,946 and 60/117,944, all filled Jan. 29, 1999.

FIELD OF THE INVENTION

The present invention is directed to configuring a server computer in a client-server environment and, in particular, to dynamically configuring interceptors.

BACKGROUND OF THE INVENTION

With the rise of the interconnected computer networks such as the Internet, it is possible to construct complex transaction-based applications that are distributed over several networked computers. In the simplest scenario, in general, these transaction-based applications function in the following way. A software application program, which executes on a client, initiates a transaction that requires access to services provided by a distant computer, called a server. Examples of these services could be an update to a database such as a bank's database, an execution of a purchase order such as in the case of purchase of a security and the like. Typically, the client sends a "request" message to the server, which then sends a "response" message containing a response to the request.

Typically, the server is not a single computer, rather a collection of interconnected heterogenous computers. The request message is then formatted in such a way that all the interconnected computers can understand and respond to the request message. If the collection of interconnected computers is configured in an object-oriented programming model, then software object (or objects) that are capable of working together to provide a response to the request message can be distributed among the several computers. But in order to access the objects from a remote computer the objects must somehow publish their existence, their addresses, their properties, the services they provide, and other details to the "outside" world. Then, a client may be able to use the services provided by sending a request message in a manner similar to making a remote procedure call ("rpc") and obtaining a response to that message.

Various paradigms exist as a result of the need to standardize the methods by which objects can be distributed and accessed over a network. These are Microsoft Corporation's Distributed Component Object Model (DCOM), JavaSoft's Java/Remote Method Invocation (Java/RMI), and Object Management Group's Common Object Request Broker Architecture (CORBA).

Though some differences are present among these models, they principally work in the following way. Objects that provide services are typically located on servers. These objects are queried by applications running on clients using a specified data communication transport layer protocol—the Object Remote Procedure Call (ORPC) for DCOM; the Java Remote Method Protocol (JRMP) for Java/RMI; and the Internet Inter-ORB Protocol (IIOP) for CORBA. A client suitably formats a query message in the appropriate protocol language and transmits the query message, which is routed to the appropriate server, whereupon it is executed, and a response message is formatted and routed back to the client. As referred to herein, the term "object" may mean the object definition, associated operations, attributes, etc., and implementation for that object. As will be appreciated by those of skill in the art, at times the term "object type" is used to refer to the definition of the operations and attributes that software external to the object may use to examine and operate upon the object. The "object type" is also known as the "interface." Also, the term "object" may be used to refer to an actual run-time instance of an object and will be made clear by the context.

A server configured to be a Java/RMI server comprises objects that have predefined interfaces, which can be used to access the server objects remotely from another machine's Java Virtual Machine (JVM). A Java/RMI server object interfaces declare a set of methods that indicate the services offered by that server object. A program resident on the server called an RMI Registry stores and makes available to clients information about server objects. Typically, a client object obtains information regarding the methods and other properties of a server object by performing an operation such as "lookup". for a server object reference. This lookup typically works by the client object specifying an address in the form of a Universal Resource Locator (URL) and transmitting the address to the server's RMI Registry.

The clients and servers also include interceptors. The interceptors provide hooks to programmers to execute their piece of code at certain points during ORB. Typical uses of the interceptors include: transaction service integration, security message compression and encryption, fault tolerance and other operations such as tracing, profiling, debugging, logging.

In CORBA, each CORBA object transparently interacts with an Object Request Broker (ORB), which provides a means to access either local or remote objects. The ORB is essentially a remote method invocation facility, and forms the lowest layer of the several layers in CORBA. Each CORBA server object exposes a set of methods, and it declares its interface. A CORBA client obtains an object reference and determines which methods are provided by the object. A CORBA client needs only two pieces of information: a remote object's name, and how to use its interface. The ORB is responsible to locate the object, provide a vehicle by means of which a query is transmitted to a server object and a response is transmitted back to the client object. In general, a CORBA object interacts with an ORB by either using an ORB's interface or using an Object Adapter.

There are two kinds of object adapters, the Basic Object Adapter (BOA) and the Portable Object Adapter (POA). The BOA (or the POA) typically has methods for activating and deactivating objects, and for activating and deactivating the entire server. These are intended for systems where the ORB and the server are separate programs or even on separate machines. Different vendors supplying CORBA-compliant servers ordinarily choose one or the other of these methods of an object-ORB interaction.

As described above, CORBA objects take form within server applications. In a server, CORBA objects are implemented and represented by programming language functions and data. The programming language entities that implement and represent CORBA objects are called servants. A servant is an entity that provides a body for a CORBA object, and for this reason, the servant is said to incarnate the CORBA object.

Object adapters such as the CORBA-standard Portable Object Adapter (POA) mediate between an ORB and a set of programming language servants. In general, though there could be many instances of POAs to support CORBA objects of different styles, and all server applications have at least one POA called the Root POA. Each POA instance represents a grouping of objects that have similar characteristics. These characteristics are controlled via POA policies that are specified when a POA is created. The Root POA, which is present in all server applications, has a standard set of policies. POA policies are a set of objects that are used to define the characteristics of a POA and the objects created within it. The CORBA standard specifies that interfaces for POA, POA manager (which is a class to manage multiple POAs) and the POA policies are defined in a standard module.

The above discussed technologies have been utilized in the Internet. However, the next phase of the Internet revolution is predicted to be interconnection of isolated Internet systems with the systems that run the business to create a responsive, flexible, scalable, and differentiated eBusiness enterprise. The information systems that connect eBusiness with the enterprise are coming to be known as enterprise portals.

Enterprise portals can act as new storefronts, new front-offices, new sales and support agents for the enterprise, with profound implications. Enterprise portals will leverage an enterprise's processes, data, and transactions on the Internet. They will simplify access to a mix of Internet and non-Internet applications, built with heterogeneous formats, platforms, protocols and software. This universe of diverse content, interactions, transactions, and application functions will require new methods of organization and management, particularly to keep up with frequent changes in the business.

The enterprise portals are becoming popular because the Internet affords large opportunities to extend business and invent new business models. Enterprise portals hold the key for these established companies to "bricks and clicks" strategies that weave online services with their existing channels, production facilities, and other business elements into a powerful combination.

Enterprise portals require scalable, flexible and open distributed platforms, the ability to leverage and extend the full range of resources inside and outside of the corporate walls, and the ability to accommodate rapid, continual change. At their root, enterprise portals host a different kind of application—the composite application.

Composite applications combine new business logic with existing logic, processes, and data to meet business needs. A new system is required to provide all of the components of an enterprise portal infrastructure. This new set of server-based products marshals the company's expertise in design and support of enterprise systems from diverse applications using object and component technologies.

SUMMARY OF THE INVENTION

Therefore, the present invention provides a flexible, robust, CORBA 3.0 middleware engine. Adaptive Runtime Technology™ (ART) framework, a microkernel architecture that supports dynamic configurations of the architecture. It should be noted that the present invention is described below by discussing various ports of the ART framework. In particular, the present invention provides a computer implemented method of creating and managing one or more interceptors. The method includes the steps of intrinsically chaining the interceptors, and storing state information, in at least one of the chained interceptors, directed to a reference to the next interceptor. The chained interceptors can be recursive interceptors.

The method can further comprise the steps of splitting, in a server, the chained interceptors into a first and a second interceptor chains. The first interceptor chain can be a per-client interceptor chain. The second interceptor chain can be one of a per-endpoint and a per-object interceptor chain.

The present invention further provides a server computer in a client-sever environment. The server includes a processor configured to generate one or more interceptors and to intrinsically chain the interceptors, and a memory associated with at least one of the chained interceptors and configured to store state information directed to a reference to the next interceptor thereof.

The processor can be further configured to generate the chained interceptors as recursive interceptors and to split the chained interceptors into a first and a second interceptor chains.

BRIEF DESCRIPTION OF THE DRAWINGS

Preferred features of the present invention are disclosed in the accompanying drawings, wherein similar reference characters denote similar elements throughout the several views, and wherein.

DETAILED DESCRIPTION OF THE INVENTION

Figure 1:
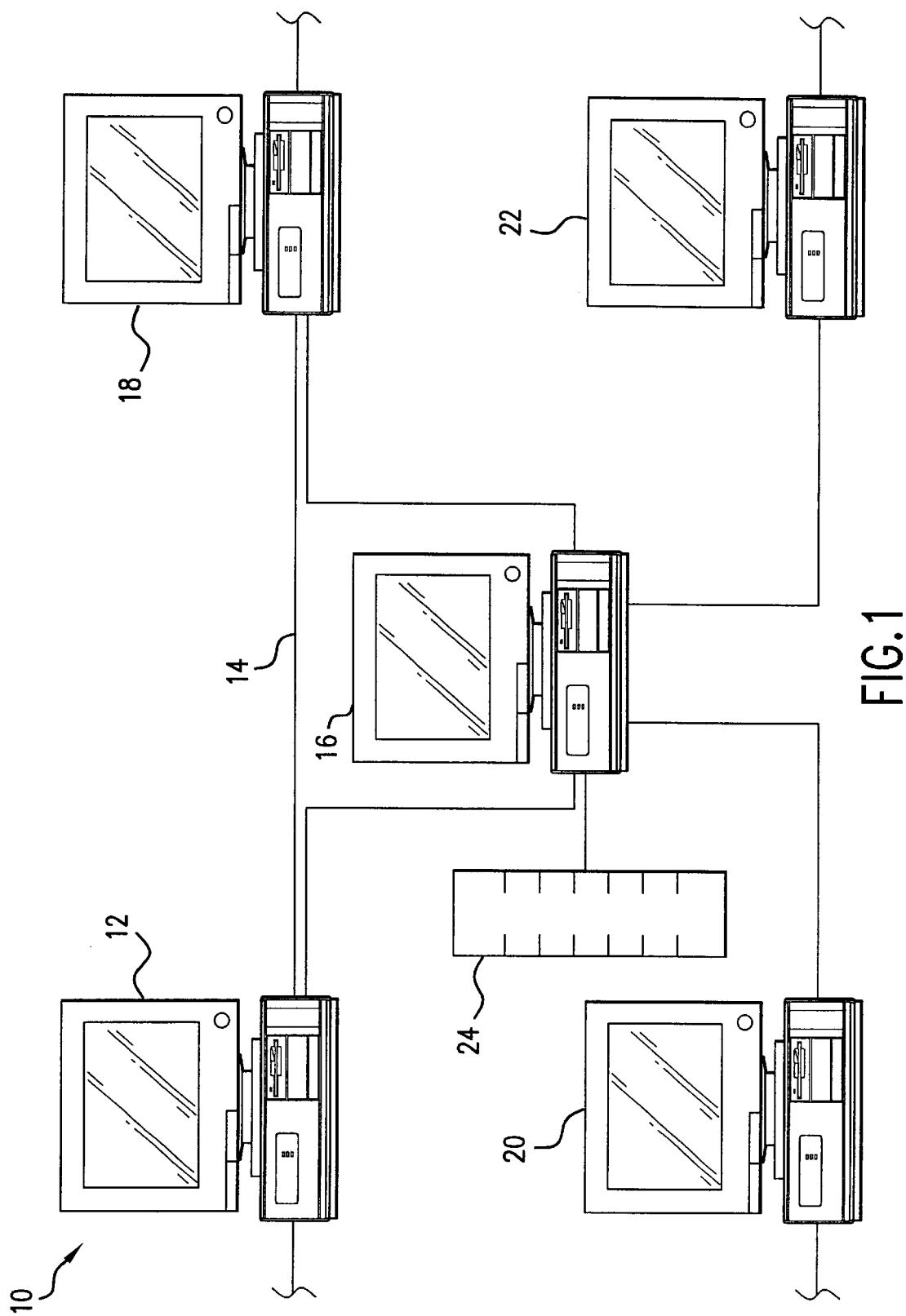
FIG. 1 is a diagram that illustrates of a computer network for the distributed objects of the present invention.

Referring to FIG. 1, distributed objects of the present invention are located on one or more computers linked together by a computer network exemplified in a network In particular, the network 10 includes a computer 12 coupled to a network 14. The network 14 can further include a server, router or the like 16 in addition to other computers 18, 20, and 22 such that data, instructions and/or messages can be passed among the networked computers. A mass storage devices 24 may also be connected to the server 16 or to any of the computers. Further, some computers 12, 18 may include an independent network connection between them, whereas other computers 20, 22 may not include such a connection. Various ways to design, construct and implement the computer network as known in the art are contemplated within this invention.

Figure 2:
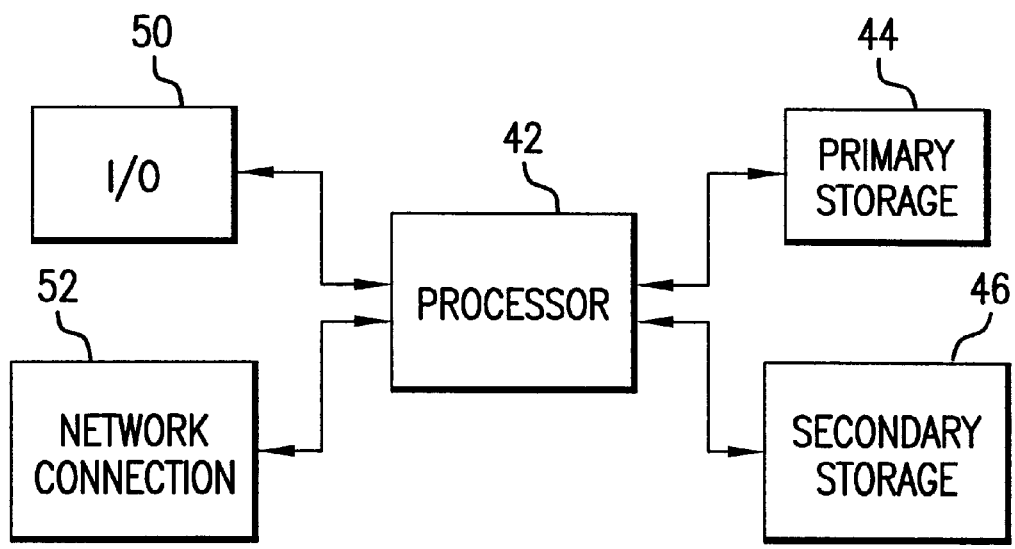
FIG. 2 is a block diagram of a typical computer of the present invention.

Referring to FIG. 2, each computers 12, 16, 18, 20, and 22 includes a processing unit 42, a primary storage device 44 and a secondary storage device 46. The processing unit 42 can be, but not limited to, a central processing unit (CPU), or multiple processors including parallel processors or distributed processors. The primary memory device 44 includes random access memory (RAM) and read only memory (ROM). The RAM stores programming instructions and data, including distributed objects and their associated data and instructions, for processes currently operating on the processor 42. The ROM stores basic operating instructions, data and objects used by the computer to perform its functions. The secondary storage device 46, such as a hard disk, CD ROM, magneto-optical (optical) drive, tape drive or the like, is coupled bidirectionally with processor 42. The secondary storage device 46 generally includes additional programming instructions, data and objects that typically are not in active use by the processor, although the address space may be accessed by the processor, e.g., for virtual memory or the like.

Furthermore, each of the above described computers can include an input/output source 50 that typically includes input media such as a keyboard, pointer devices (e.g., a mouse or stylus) and the like. Each computer can also include a network connection 52. Other variations of the above discussed the computer and its components available to one of skill in the art are also contemplated within the present invention.

In the present invention computer network is defined to include a set of communications channels interconnecting a set of computer systems that can communicate with each other. The communications channels can include transmission media such as, but not limited to, twisted pair wires, coaxial cable, optical fibers, satellite links, and/or digital microwave radio. The computer systems can be distributed over large, or "wide" areas (e.g., over tens, hundreds, or thousands of miles. WAN), or local area networks (e.g., over several feet to hundreds of feet, LAN). Furthermore, various local- and wide-area networks can be combined to form aggregate networks of computer systems. One example of such a network of computers is the "Internet".

Having discussed a client-sever computing environment, the following is the ART framework briefly described above.

I. Binding in the ART Framework

This section describes how the ART framework establishes bindings between client applications and target objects, how it represents them, and how the ORB services of which they are composed participate in invocations of requests on those objects.

The verb bind means "to tie". As discussed above this section is directed to describing tying together the applications that make up a distributed system. In particular, the verb binding can be defined as the process of establishing a channel over which communications can take place, and the noun binding as the realization of such a channel. In CORBA, the binding process is initiated by a client application attempting to make an invocation using an object reference for which no appropriate binding already exists. The target object reference identifies the server application with which a binding will be established. The binding that is established represents the negotiated protocol and services that allow the client to make invocations on the target object, and any shared state required by the protocol and services at the client and server.

The ART binding process can be modeled as a black box with inputs and outputs. The inputs are the target object reference and the client-side policies that constrain the binding process. The outputs are the selection of client-side and server-side ORB services, including the transport protocol, that make up the binding, plus any binding-specific state that they maintain. This section describes the following aspects of this process and its results:

policy representation and management standard Quality of Service (QoS) policies

ORB service representation and management the role of an Interoperable Object Reference (IOR) proxy in binding binding establishment and lifecycle binding representation as interceptors request processing by interceptors co-located bindings co-located request processing The representation of object references as IORs is described in IOR Section below, and message-level interceptors will be described in GIOP Section, and plug-in management will be described in Plug-in section.

This binding and interceptor design is driven by functional requirements from several current and upcoming OMG specifications, and to support pluggable transports and ORB services. Related OMG specifications include the following:

The use of Policy objects to influence binding was introduced in the CORBA Security Service specification, and the interfaces involved have been significantly modified.

The CORBA Messaging RFP response is generalizing the use of Policy objects in order to provide control of QoS. The proposed APIs are being used as a basis for the present invention.

The specification of interceptor interfaces from the original CORBA Security Service specification has been moved to the core in CORBA 2.2, but there are severe problems with these interfaces, so they are not being used as a basis in the present invention.

Several responses to the Realtime CORBA RFP attempt to address binding and interceptors.

The binding and interceptor design is an area where ART will provide valuable innovative functionality for which OMG specifications do not yet exist.

Components involved in binding and request processing in ART range from the policy management APIs used by applications to specify qualities of service (QoS) and other properties that effect the binding process, down to the interceptors that process requests once a binding has been established. The extremes cases handled by policy management and interceptors are discussed first, and then the binding process that connects them are described.

1. Interceptors

Interceptors are locality-constrained objects that ORB services, including transports, implement in order to participate in the processing of operation invocations. Interceptors are used in both the client and the server, often with corresponding interceptors in each process performing a particular level of protocol interactions such as message transport, message generation/interpretation, or transaction propagation. Binding, which will be discussed in detail below, results in a chain of initialized interceptor instances at the client and a similar chain at the server through which responsibility for processing the request flows.

ART core defines the interfaces by which all interceptors are created and managed during the binding process, and defines the interfaces by which responsibility for processing a request is initiated and passed between request-level interceptors. The interfaces by which messages are passed between any message-level interceptors involved in a binding are not described in this section. See GIOP Section for a description of the message-level interceptor interfaces used in ART's family of General Inter-ORB Protocol (GIOP)-based protocols.

This section discusses the interceptor interfaces in the ART core, as well as the factory interfaces used to construct chains of interceptors in the client and server. It presupposes that potential client-side bindings are represented as lists of interceptor factories. The generation and selection of these lists of interceptor factories will be addressed in the Binding section.

2. Design Options and Choices

The CORBA 2.2 specification has moved the description of interceptors from the CORBA Security specification into the CORBA core, but has not addressed any of the flaws in the specified interceptor interfaces. The CORBA Security 1.2 RTF attempted to re-specify the interceptor interfaces, but gave up because the proposed solution would have significantly constrained ORB architectures, and because the result, which still did not address binding, service contexts, Currents, IOR creation or interpretation, or policy management, would not have provided a comprehensive solution for ORB service portability.

One of the initial responses to the Realtime CORBA REP, orbos/98-0-08, also attempted to define workable interceptor interfaces, with an approach very different than that in CORBA 2.2 or in the Security RTF's aborted effort. Another initial response, orbos/98-01-15, identified transport replaceability as a requirement, but it did not propose a solution. The remaining Realtime CORBA REP submissions have not made interceptors a priority.

Many with influence in the OMG are now adopting the view that comprehensive ORB service portability interfaces will only be adopted and implemented, if at all, through a separate REP process.

(1) Iterative vs. Recursive Chaining

The ORB service replaceability mechanism, known as "filters", may use an iterative model to pass control to each interceptor. At several points during the processing of a request, the ORB core iterates over a list of filters, and makes a call on each filter allowing it to do whatever processing is appropriate at that filter point. The ORB service replaceability mechanism in HP ORB Plus is similar, as was the approach taken in the aborted Security RTF effort.

The interceptor interfaces in the original CORBA Security specification, which are now in the CORBA 2.2 core, use a recursive model. In a recursive model, the ORB core passes control to the first interceptor, which does its processing and then passes control to the next interceptor, and so on, until the last interceptor does its processing and passes control back to its previous interceptor, which passes control to its caller, and so forth, until control is returned to the ORB core.

The ART interceptor architecture preferably uses the recursive model for the following reasons:

Performance—Calling N interceptors using the iterative model, with two filter points, requires 2*N function calls and returns, and two filter points at the client or server may not be sufficient. Calling N interceptors using the recursive model requires only N function calls and returns.

Flexibility—The iterative model does not allow an interceptor to transfer processing to a different thread, whereas the recursive model allows one interceptor to call the next in a different thread than the one in which it was called. The recursive model also allows an interceptor to decide not to call the next interceptor, to call the next interceptor more than once if necessary, and to call the next interceptor during initialization.

Adaptability—A recursive architecture can easily be adapted to support iterative model filters by installing a recursive interceptor that calls out to a set of filters at the appropriate points in processing the request. But an iterative architecture cannot efficiently be adapted to support recursive model interceptors; this would require extra threads.

The purely recursive model of interceptors described in CORBA 2.2 does not address deferred synchronous or asynchronous invocations, in which the client thread making a request should not wait for its response to arrive and be processed. A purely recursive model also does not efficiently support queuing of requests for later processing, since the call stack of previously called interceptors are preserved. The ART interceptor interfaces address these issues by allowing recursively called interceptors to return to their callers in certain circumstances before the response to the request has arrived.

(2) Intrinsic vs. Extrinsic Chaining

There are two distinct approaches to how recursive interceptors are linked to form a chain. The interceptor specification in CORBA 2.2 uses extrinsic chaining, in which an interceptor hands control to the next interceptor by calling CORBA::Request:invoke( ) which then calls the next interceptor. The alternative is to chain interceptors intrinsically, where each interceptor directly invokes the next one.

ART preferably uses intrinsic chaining of interceptors for the following reasons:

Performance—Calling back into the ORB core doubles the function call overhead. It also requires the ORB core to keep track of the current position in the chain of interceptors.

Flexibility—Intrinsic chaining allows one interceptor to call the next as many times as it requires, or not at all. It also allows it to call the next interceptor during initialization.

Adaptability—Support for extrinsic chaining could be added to an architecture based on intrinsic chaining by wrapping the interceptors that expect extrinsic chaining with one that does intrinsic chaining. The wrapper would also wrap the CORBA::Request passed to the wrapped interceptors. An architecture based on extrinsic chaining cannot be adapted to simulate intrinsic chaining.

It could be argued that extrinsic chaining enhances security by preventing an application or interceptor from bypassing other required interceptors. Instead, ART ensures that an application has a basis to trust the plug-ins that are loaded into its address space, and any interceptors that these plug-ins contain.

(3) State and its Initialization

A specification of interceptors that uses extrinsic chaining might require that interceptors maintain no binding-specific state. ART interceptors are intrinsically chained so that they at least maintain state containing the reference to the next interceptor. ART interceptors are expected to maintain any relevant state they need in order to most efficiently perform their intended functionality. Adapting this architecture to support extrinsic chaining would at the same time allow it to support stateless interceptors.

The CORBA 2.2 interceptor specification does not provide any special support for initialization of interceptor state at binding time. It simply creates the interceptors and dispatches the first request to them. This is possible because it uses extrinsic chaining, but ART preferably requires an initialization phase in order to set up the intrinsic links between interceptors before an operation can be invoked. This initialization will be done via operations on interceptor factories that return the initialized interceptors. In the client, the interceptors closer to the network are preferably initialized before those farther from the network, allowing communication during initialization if necessary.

(4) Granularity and Sharing

Two kinds of filters are provided in the present invention: per-process and per-object. HP ORB Plus only has per-process ORB service hooks. Per-process interceptors would apply to all invocations made to or from the process, and would therefore impact performance even when their functionality is not needed for a particular binding. They also lead to potential conflicts where two different interceptors cannot be involved in the same binding, but both are needed in the process. Per-object interceptors would avoid these issues, but would not scale to large numbers of objects.

Establishing chains of interceptors, or bindings, at process or even ORB granularity does not provide the needed flexibility, and binding at the object granularity does not scale. Therefore, ART will provide most of the flexibility of per-object binding, but with much better scaleability, by binding at endpoint granularity. An endpoint is defined here as a group of objects that are always co-located with each other and that have the same server-side policies. The ART IOR representation already establishes this notion of endpoint, and enables a client to efficiently recognize that two objects share an endpoint. The details of ART IOR is described below in the ART IOR section.

A unique chain of interceptors per-endpoint at the client side, and per-endpoint/client combination at the server side scales better than per-object interceptor, but still leaves room for improvement. On the client side, the interceptor factory operations will not be required to return a unique interceptor each time they are called. If they determine that an existing interceptor can be shared, they are free to return that interceptor. This results in a client side architecture where many higher-level bindings share a lower-level binding.

On the server-side, a different approach to sharing is also taken. The effective server-side chain of interceptors for a binding is split into two separate chains. The first chain is per-client, with potential sharing of lower-level bindings by higher-level bindings as on the client side. The other chain is per-endpoint or per-object and shared among all clients of the endpoint or object.

3. Base Interceptor Interface

All interceptors implement interfaces that inherit from the ART_Binding::Interceptor interface:

```
module ART_Binding
{
    interface Interceptor
    {
    };
};
```

It should be noted that common operations or attributes, such as the ability to identify an interceptor or print its state to an ostream can also be included in the above module.

4. Initialization and Shutdown

An instance of the ART_BindingManagerImpl implementation of the ART_Binding::BindingManager interface is constructed for each ORB instance during RB initialization. When the ORB is shutdown, the shutdown( ) operation is invoked on his instance before a similar shutdown( ) operation is invoked on the IORManager.

```
module ART_Binding
{
    interface BindingManager
    {
        //...
        void
        shutdown ( );
        //...
    };
};
```

It should be noted that if destruction needs to be delayed until all bindings are actually destroyed, then ITCxxDOAF-lyweightFactoryServantBase can be utilized.

II. Client Binding

This section describes how requests are processed in an ART client.

1. Client-side Interceptors and Factories

Client-side interceptors, whether request-level or message-level, are preferably constructed and assembled into chains the same way during the client-side binding process. The following IDL shows the interfaces involved:

```
module ART_Binding
{
    exception LocationForward
    {
        ART_IOR : : IOR new_ior;
    };
    interface ClientInterceptor
    : Interceptor
    {
        readonly attribute ClientInterceptor next_interceptor;
    };
    interface ClientInterceptorFactory
    {
        ClientInterceptor
        get_interceptor (
            in ART_IOR : : Profile profile,
            in CORBA : : PolicyList policies, //
            in ClientInterceptor next_interceptor
        ) raises (LocationForward);
    };
    interface BindingManager
    {
        //...
        void
        register_client_interceptor_factory (
            in ClientInterceptorFactory factory
        );
        void
        unregister_client_interceptor factory
            in ClientInterceptorFactory factory
        );
        //...
    };
};
```

The ART_Binding::ClientInterceptor interface is preferably inherited by the client-side request-level and message-level interceptor interfaces. Although request-level interceptors precede message-level interceptors in a client-side binding, both types are created and chained together during binding in substantially the same way using the ART_Binding::ClientInterceptorFactory interface. The derived interface for request-level client-side interceptors are described below. If message-level interceptors are used, the last request-level interceptor in the binding is responsible for converting the invocation between request-level and message-level.

Once an appropriate list of ClientInterceptorFactory instances and an IOR profile have been selected, using a process that will be described later, the ART core attempts to construct a binding as follows: First, it calls the get_interceptor( ) operation on the factory for the interceptor closest to the network, passing in the selected profile and effective [client-side] policies as well as a nil next_interceptor reference. If this succeeds and returns a non-nil ClientInterceptor reference, the ART core then calls the next factory, passing in the same profile and policies, plus the returned reference from the previously called factory. This process repeats until all the factories have been called and a complete chain of ClientInterceptors has been created, or an error has occurred. Note that interceptor factories, except for the one closest to the network, can simply return the ClientInterceptor that was passed in as the next_interceptor parameter if they determine that they do not need to be represented in the binding.

If a ClientInterceptorFactory determines that binding should start over with a new IOR, it raises a LocationForward exception containing that new IOR. This would happen, for example, if a GIOP interceptor factory received a location forward response to a locate request it made during the binding process. If it cannot find or create an appropriate ClientInterceptor for any other reason, the ClientInterceptorFactory raises an appropriate standard system exception.

The ART_Binding::BindingManager::register_client_interceptor_factory( ) operation is called by a plug-in during ORB initialization to register ClientInterceptorFactory to be used when establishing bindings for that ORB. The unregister_client_interceptor_factory( ) operation can be called to prevent a registered instance from participating in new bindings. The BindingManager holds a reference to the factory from the time register_client_interceptor_factory( ) is called until either shutdown( ) or unregister_client_interceptor_factory( ) is called. It should be noted that a scheme can be provided to organize these factories into legal bindings.

2. Client-side Request-level Interceptors

Once a client-side binding has been created, requests are preferably dispatched to the initial request-level interceptor and from one request-level interceptor to the next, using operations defined in the ART Binding::ClientRequestInterceptor interface:

```
module ART_Binding
{
    exception Rebind
    {
    };
    interface ClientRequest // or struct
    {
        readonly attribute CORBA::Request request;
        readonly attribute ART_IOR::Profile profile;
        readonly attribute IOP::ServiceContextList
in_service_contexts;
        readonly attribute IOP::ServiceContextList
out_service_contexts;
        readonly attribute ThreadContext thread_context;
    };
    interface ClientRequestInterceptor
        : ClientInterceptor
    {
        void
        invoke (
            in ClientRequest request
        ) raises (LocationForward, Rebind);
        void
        send_async(
            in ClientRequest request,
            in CORBA::ReplyHandler reply_handler // Messaging
module
        ) raises (LocationForward, Rebind);
        CORBA::PersistentRequest            //
        send_deferred(
            in ClientRequest request
        ) raises (LocationForward, Rebind);
    };
};
```

The ART Binding::ClientRequest interface encapsulates all the information involved in making a request, allowing the request to be passed from one interceptor to another interceptor as a single parameter, and allowing it to be queued or passed between threads. An instance is preferably created by the ART core prior to calling one of the three invocation operations on the first ClientInterceptor of the binding that will be used for the request. Contrary to normal C++ mapping rules, the caller is not responsible for releasing pointers returned from ClientRequest attribute accessors.

It should be noted that IORRequest::invoke( ) can handle the SyncScopePolicy. Alternatively, an interceptor can check this. If an interceptor does it, the interceptors can queue the request and return even for synchronous invocations that are effectively oneway as known in the art.

(1) Synchronous Invocations

The invoke( ) operation of the ART_Binding::ClientRequestInterceptor interface preferably passes responsibility for a synchronous invocation to the client-side request-level interceptor on which it is invoked. The interceptor performs its pre-request processing and then pass responsibility on to its next interceptor. When its next interceptor returns, the interceptor performs its post-response processing, and then return to its caller. If its next interceptor is also a ClientRequestInterceptor, it passes responsibility to it by calling invoke( ) on it, passing along the same ClientRequest that was passed to it. Since all request-level client-side interceptors precede any message-level interceptors in a binding, only the last ClientRequestInterceptor in a chain will not pass responsibility for the request onto another ClientRequestInterceptor. If this last ClientRequestInterceptor is the GIOP client-side request-level interceptor, it converts the request to a Request message, or a series of Request message fragments, and passes these to the next interceptor on the chain, which would be a GIOP-specific client-side message-level interceptor. GIOP response message fragments preferably find their way back to the GIOP ClientRequestInterceptor, which will then process the response and return control to its caller.

It should be noted that INV_NO_RESPONSE, and various SyncScopePolicy values can be handled for invoke( ) as known to one of ordinary skill in the art.

(2) Asynchronous Invocations

The send_async( ) operation preferably passes responsibility for an asynchronous invocation to a ClientRequestInterceptor. The response to the invocation is delivered, to this process or another, as an invocation on the CORBA::ReplyHandler reference passed in as a parameter. Each ClientRequestInterceptor in the chain does its pre-invoke processing and then passes responsibility to its next interceptor, by calling send_async( ) and passing along the same ClientRequest and ReplyHandler if not the last ClientRequestInterceptor on the chain. As each send_async( ) call returns to its caller, ClientRequestInterceptors can do any necessary cleanup processing, but cannot assume whether or not a response has been delivered yet.

It should be noted that the messaging specification has ReplyHandler and lots of other types in modules other than CORBA. They can be moved into the CORBA module so that may become usable on CORBA module stubs.

It should also be noted that if the request is not time-independent, the transport interceptor needs to remember the signature so that it can convert the response to an invocation on the ReplyHandler. The ART core might provide some assistance in this aspect. A time-independent invocation can be treated differently than a regular one.

(3) Deferred Synchronous Invocations

The send_deferred( ) operation passes responsibility for a deferred-synchronous invocation to a ClientRequestInterceptor, or from one ClientRequestInterceptor to the next. The last ClientRequestInterceptor in the chain then returns a CORBA::PersistentRequest that represents the state of the request and can be used to poll or pend for a response, or to install a ReplyHandler. As send_deferred( ) calls return, the caller can do cleanup processing, but cannot assume whether or not a response has been received.

It is noted again that the PersistentRequest is not in the CORBA module in the current Message draft. Non-TII transports to create local non-persistent instances of Persistent Request and deferred synchronous invocations can be implemented as known in the art.

III. Server-side Binding

This section discusses how requests are processed in an ART server. In particular, it describes the interfaces used by transports, object adapters, and other interceptors in establishing server side bindings and in processing requests via those bindings.

The ART architecture allows plug-ins to participate in the processing of requests by supplying interceptors that are included in bindings. In ART, transport protocols (e.g., GIOP, ORB), services (e.g., transactions), and object adapters (e.g., POA), are all packaged as plug-ins and implemented as interceptors. A binding is the set of interceptors involved in communication between a particular client and a particular object or set of objects. Different interceptor and binding interfaces are involved in the client and server roles that make up an invocation.

1. Server-side Interceptors

A server-side binding in ART is typically composed of two separate chains of interceptors. The first chain is made up of message-level interceptors, and is present only if the transport being used is implemented in terms of message-level interceptors. The second chain is made up of request-level interceptors, and is independent of the client and transport making the request.

The first chain could contain request-level interceptors when some basis exist to associate them with the connection. One possibility would be to add them in response to received service contexts. Another would be to have an interceptor in the per-endpoint chain to cause a related interceptor to get instantiated in the per-connection chain.

The establishment of server-side bindings has not yet been addressed. For now, the POA is just creating and registering bindings containing its own interceptors.

It should be noted that support per-session request level interceptors can be included in the present invention as well, thereby providing the advantages of UDP and Multicast transports. In particular, session that is based on connections when they are used and on a higher-level service when connections are not used but sessions are needed can also be provided in the present invention.

Once a transport server has received an incoming request message header, and has processed it using any appropriate message-level interceptors, the request is dispatched to the server-side interceptors via the following basic steps:

1) The transport server preferably calls the start_server_invocation( ) operation of the BindingManager, passing in the object key from the request header.
2) The BindingManager preferably performs a best-match lookup on the object key to find an appropriate ART_Binding::ServerBinding object, which contains the list of ART_Binding::ServerRequestInterceptors to use in processing the request. It increments the ServerBinding's count of in-progress invocations, and then returns its reference to the transport server. If no matching full or partial object key is found, the BindingManager instead returns a reference to a special ServerBinding that causes the invocation to return a CORBA::OBJECT_NOT_EXIST exception to the client.
3) The transport server then preferably constructs an instance of its implementation of the ART_Binding::ServerRequest interface. This interface inherits from two other interfaces. The inherited ART_Binding::ServerRequestData interface contains the object key, operation name, and service context from the received request message, an initially empty service context for the reply, a thread context, and attributes to hold the client context, arguments, result, and exception. The inherited ART_Binding::ServerRequestCallback interface encapsulates the capabilities to read the remainder of the received message and to send a reply message.
4) The transport server passes this ServerRequest to the dispatch_request( ) operation of the ServerBinding that it obtained from the BindingManager.
5) The ServerBinding calls the invoke( ) operation on the first ServerRequestInterceptor in the chain, passing the transport's ServerRequest as separate ServerRequestData and ServerRequestCallback parameters.
6) The ServerRequestInterceptor does its initial processing for the request and then calls invoke( ) on the next ServerRequestInterceptor in the chain. It passes to this next interceptor the ServerRequestData that was passed to it, and either the same ServerRequestCallback instance that was passed to it, or an instance of its own wrapper implementation of the ServerRequestCallback interface that encapsulates the received ServerRequestCallback. This process repeats until the last ServerRequestInterceptor receives control.
7) The last ServerRequestInterceptor, typically provided by the object adapter used to implement the target object, preferably invokes a series of operations on the ServerRequestData and ServerRequestCallback instances that were passed to it. Wrapper ServerRequestCallback implementations passed along by intermediate ServerRequestInterceptor s perform their own processing as well as delegate the operations back to the encapsulated ServerRequestCallback instances, so that these operations are ultimately performed by the original ServerRequest instance created by the transport server. The operations performed by the object adapter in a typical successful invocation are as follows:

Obtain the object key and the operation name from the ServerRequestData, and then determine the signature of the operation being invoked, as well as the servant whose method will execute the operation.

Set the arguments attribute of the ServerRequestData instance to a properly typed NVList into which the in and inout parameters are to be demarshaled.

Call read_inputs( ) on the ServerRequestCallback instance in order to demarshal the in and inout parameters from the request message into the arguments attribute of the ServerRequestData instance.

Set the result( ) attribute of the ServerRequestData instance to contain a properly typed Any for the operation result.

Execute the method, using the in and inout parameters values from the arguments attribute, and, placing the out and inout parameter values in the arguments attribute and the result in the result attribute.

Call set_success( ) on the ServerRequestData instance to indicate that the operation succeeded.

Call write_outputs( ) on the ServerRequestCallback instance to cause the reply message to be sent, containing the result and the out and inout parameters.

Call complete( ) on the ServerRequestCallback instance, indicating that all resources associated with the request can be released, and no further calls will be made on the ServerRequestData or ServerRequestCallback instances.

8) When complete( ) is called on the transport server's ServerRequest instance (which inherits the ServerRequestCallback interface), the transport server calls invocation_complete( ) on the ServerBinding instance it obtained from the BindingManager in step 2.

9) The ServerBinding decrements its count of in progress invocations.

10) After the last ServerRequestInterceptor has made the appropriate calls on the ServerRequestData and ServerRequestCallback instances to carry out the operation and return the results, it returns from its invoke( ), which returns from its invoke( ), and so forth.

The above described basic process is further explained below in this section with respect to memory management and threading. The memory management rules, and constraints on the order in which ServerRequestData and ServerRequestCallback operations are invoked, enable the arguments to be allocated either on the stack or on the heap, or even supplied by a collocated client. The threading rules, combined with the memory management rules, allow the request to be dispatched between threads or even queued for processing at a later time. The ability to dispatch and queue request processing is achieved by allowing a ServerRequestInterceptor in step 6 above to return to its caller (allowing step 10 to proceed) before passing control to the next interceptor in the chain.

Request outcomes other than success are preferably handled by calling different operations on the ServerRequestData and ServerRequestCallback instances in step 7 above. Locate requests are processed similarly to normal requests, with the ServerLocateRequestData and ServerLocateRequest interfaces used in place of the ServerRequestData and ServerRequest interfaces, respectively.

Finally, the ART core supplies a concrete implementation of the CORBA::ServerRequest interface, ART_ServerRequestImpl, that encapsulates references to instances of the ART_Binding::ServerRequestData and ART_Binding::ServerRequestCallback interfaces used at the interceptor level. This class, intended for use by the DSI implementations in the POA and other object adapters, adapts the internal ART server-side interfaces and semantics to the standard CORBA::ServerRequest interface and semantics. Extensions to the standard CORBA::ServerRequest interface and semantics are provided in order to also efficiently support skeleton-based object implementations.

(1). The ServerRequestInterceptor Interface

Plug-ins that implement ORB services or object adapters preferably provide locality constrained implementations of the ART_Binding::ServerRequestInterceptor interface, defined by the following EDL, in order to participate in a server-side binding's processing of invocations:

```
module ART_Binding
{
    interface ServerRequestInterceptor
        Interceptor
    {
        readonly attribute ServerRequestInterceptor next_interceptor;
        void
        invoke (
            in ServerRequestData data,
            in ServerRequestCallback callback
        );
        void
        locate (
            in ServerLocateRequestData data,
            in ServerRequestCallback callback
        );
    };
};
```

The next_interceptor attribute provides access to the next interceptor in the binding, if any. It is always nil for the last interceptor in the binding, and non-nil for the other interceptors. It is exposed in the interface in order to allow the ART core to inspect bindings.

The invoke( ) operation preferably transfers responsibility for the execution of a request to the ServerRequestInterceptor on which it is called. The request is represented by the data and callback arguments, which are references to instances of the ServerRequestData and ServerRequestCallback interfaces, respectively, as described below. The interceptor's implementation of invoke( ) may delegate to the next interceptor in the binding or process the request itself. If it delegates, it passes along the same ServerRequestData instance, and may either pass along the same ServerRequestCallback object, or create its own ServerRequestCallback object that encapsulates the one that was passed in. Also, even if invoke( ) delegates processing of the request to another thread, it does not need to duplicate either its data or callback parameters, since the lifecycles of these objects are controlled by the complete( ) operation on ServerRequestCallback rather than by reference counting.

The locate( ) operation transfers responsibility for the execution of a location request to the ServerRequestInterceptor on which it is called. It is similar to the invoke( ) operation, except that its data parameter is a ServerLocateRequestData instance rather than a ServerRequestData instance. A location request is a query regarding the location of the target object, and does not imply the invocation of an operation on that object.

Either the invoke( ) or locate( ) operation may throw a system exception. If this happens before write_outputs( ) has been called on the callback parameter, it can be caught and the system exception can be the outcome. But this might lead to currency issues since another thread might be processing the same request. Alternatively, throwing even system exceptions from these operations can be disallowed, treat this as an internal failure, and possibly never respond when this happens. The latter approach has the advantage of not requiring interceptors that need to be aware of exception responses to catch exceptions when they delegate.

(2) The ServerRequestData Interface

Transport plug-ins provide locality constrained implementations of the ART_Binding::ServerRequestData interface, defined by the following IDL, that provide interceptors access to the state associated with a received request:

```
module ART Binding
{
    enum ServerRequestStatus
    {
        REQUEST_IN_PROGRESS,
        REQUEST_NO_EXCEPTION,
        REQUEST_USER_EXCEPTION,
        REQUEST_SYSTEM_EXCEPTION,
        REQUEST_LOCATION_FORWARD,
        REQUEST_LOCATION_FORWARD_PERM
    };
    interface ServerRequestData
    {
        readonly attribute CORBA: :ORB orb;
        readonly attribute CORBA::OctetSeq object_key;
        readonly attribute CORBA: : Identifier operation;
        readonly attribute IOP::ServiceConteXtList
    in_service_contexts;
        readonly attribute IOP: :ServiceContextList
    out_service_contexts;
        readonly attribute ThreadContext thread_context;
```

```
            readonly attribute CORBA::IT_Context client_context;
            readonly attribute ServerRequestStatus status;
            attribute CORBA::NVList arguments;
            attribute any result;
            readonly attribute any except;
            readonly attribute ART_IOR::IOR forward_ior;
            void
            set_success ( );
            void
            set_exception(
                in any except,
                in boolean system
            );
            void
            set_forward_ior(
                in ART IOR::IOR ior,
                in boolean permanent
            );
        };
    };
```

The normal C++ memory management rules do not apply to the attributes of the ART_Binding::ServerRequestData interface. The pointers returned by the attribute accessors are not, and preferably never be, freed, deleted, or released by the caller. The attribute mutators preferably do not copy or adopt the pointers or references passed in; these pointers or references are assumed to remain valid until the write_outputs( ) operation on the associated ART_Binding::ServerRequestCallback instance has been called and has returned. Finally, the pointers returned by the client_context, arguments, result, and except accessors can potentially be null.

Only the immutable attributes (operation, object key, etc.) are valid between write_outputs( ) and completes. The arguments, result, except, and forward_ior attributes are not valid after write_outputs( ). It should be noted that completes may not be all that useful, since most of the details of the request outcome are no longer available when complete( ) is called. For instance, for an interceptor subsequent to one that raised an exception may not know what the exception was.

The lifetime of a ServerRequestData instance is controlled by the associated ServerRequestCallback instance. A ServerRequestInterceptor can assume the ServerRequestData instance passed as the data parameter to its invoke( ) operation is valid until the complete( ) operation is called on the ServerRequestCallback instance that was passed as the callback parameter to the same invoke( ) call. Invoking any operations on a ServerRequestData instance, or using any storage previously obtained from an ServerRequestData instance, after invoke( ) has been called on the corresponding ServerRequestCallback instance can result in undefined behavior.

Implementations of the ServerRequestData interface do not need to protect themselves against concurrent access. A ServerRequestData instance represents a single invocation. Processing of this invocation is serialized by passing control serially between ServerRequestInterceptor and ServerRequestCallback instances. If one ServerRequestInterceptor delegates to another in a different thread than that in which it was called, it ensures that it does not access the ServerRequestData (or the ServerRequestCallback) in the first thread after the control has been passed to the other thread.

The readonly orb attribute provides access to the CORBA::ORB instance that received the request. Its accessor can be called at any time, and the result is not released.

The readonly object_key attribute provides access to the sequence<octet> identifying the target object on which the request was invoked. This sequence<octet> is assumed to conform to the ART object key segmentation syntax described in Object Key Section below. Its accessor can be called at any time, and the result is not deleted. Unsegmented string object keys for Interoperable Naming specification can also be supported.

The read only operation attribute provides access to the CORBA::Identifier identifying the operation invoked. Its accessor can be called at any time and the result is not freed.

The read only in_service_contexts attribute preferably provides access to an IOP::ServiceContextList instance containing the service context information sent by the client to the server as part of the request message. Its accessor can be called at any time. The returned instance is not modified or deleted.

The read only out_service_contexts attribute preferably provides access to the ServiceContextList that will be sent by the server to the client as part of the reply message. Its accessor can be called at any time and the result is not deleted. Interceptors that need to include service context information in the reply to the client should append their IOP::ServiceContext instances to the returned list.

Appended ServiceContext instances can be copied or adopted, or just referenced. Requiring help allocation can be avoided. Also, internal (flyweight) representation like with IORs can be used. The flyweight supports large numbers of fine-grained objects efficiently in JAVA 1.2.

The read only thread_context attribute provides access to an ART_Binding::ThreadContext instance carrying local ORB-service-specific information associated with the request. Its accessor can be called at any time and the result is not released. Typical ORB service implementations will use information from the in_service_contexts attribute to initialize their local state in the thread_context before calling invoke( ) on the next ServerRequestInterceptor, and then make this state available to applications via an object with an interface derived from CORBA::Current.

The read only client_context attribute provides access to a CORBA::Context instance containing application-level context information included in the invocation by the client if the IDL definition of the invoked operation contains a context clause. Calling the accessor before read_inputs( ) has been called on the associated ServerRequestCallback instance will result in a CORBA::BAD_INV_ORDER exception. If called after read_inputs( ), the accessor will return a pointer to an initialized CORBA::Context if the operation declaration contains a context clause (i.e. the client marshaled one), and a nil pointer otherwise. The result is not released.

The DII can always supply an indication of whether a context clause exists in the IDL. Alternatively, if the DII does not always supply the indicator discussed above, then the above described rule can be relaxed a bit, and the proper DSI semantics can't be provided without using the IFR.

The read only status attribute indicates the outcome of the request. Its accessor can be called at any time. Its value is initially REQUEST_IN_PROGRESS, but modified, before write_outputs( ) is called on the corresponding ServerRequestCallback, by calling one or more of the set_success( ), set_exception( ), or set_forward_ior( ) operations as described below.

The arguments attribute preferably specifies and provides access to a CORBA::NVList holding the arguments for the request being processed. The NVList, which is initialized with properly-typed anys and flags matching the operation signature, can be supplied by the creator of the ServerRequestData or by one of the ServerRequestInterceptors (usually the last) to which the ServerRequestData is passed. Calling the mutator with a nil value will result in a CORBA::BAD_PARAM exception. Calling the mutator when the attribute already contains a non-nil value, or after read_inputs( ) or write_outputs( ) has been called on the associated ServerRequestCallback instance, will result in a CORBA::BAD INV ORDER exception. The NVList passed to the mutator is not copied, and remains valid until write_outputs( ) has been called on the associated ServerRequest-Callback instance and has returned. The accessor can be called at any time and the result is not released.

The result attribute preferably specifies and provides access to an any holding the result to be returned from the request being processed. Like the arguments attribute, its value (the type of the any and the storage that will contain the any's value) can be supplied by the creator of the ServerRequestData or by one of the ServerRequestInterceptors to which the ServerRequestData is passed. Contrary to the normal C++ mapping rules, the accessor can return a nil pointer, indicating that no value has been supplied yet. Calling the mutator when the attribute already contains a non-nil value, or after write_outputs( ) has been called, will result in a CORBA::BAD_INV_ORDER exception. The any passed to the mutator is not copied, and remains valid until write_outputs( ) has been called on the associated ServerRequestCallback instance and has returned. At the time write_outputs( ) is called, the result attribute matches or be interchangeable with the result type specified in the IDL definition of the operation being invoked, and a nil result value is equivalent to a result value whose TypeCode has a kind attribute of tk_void. The accessor can be called at any time and the result it returns are not released.

The read only except attribute provides access to an any holding an exception to be returned from the request being processed. Calling the except accessor when the status attribute has a value other than REQUEST_USER_EXCEPTION or REQUEST_SYSTEM_EXCEPTION will result in nil pointer being returned. The accessor can be called at any time, and the result is not released.

The read only forward_ior attribute provides access to an ART_IOR::IOR instance to which the client should be redirected in order to invoke operations on the target object. Calling the forward_ior accessor when the status attribute has a value other than REQUEST_LOCATION_FORWARD or REQUEST_LOCATION_FORWARD_PERM will result in a nil reference being returned. The accessor can be called at any time and the result is released.

The except and forward_ior accessors can raise BAD_INV_ORDER if status is not correct instead of returning nil.

The set_success( ) operation sets the value of the read only status attribute to REQUEST_NO_EXCEPTION. Calling set_success( ) when the status attribute has a value other than REQUEST_IN PROGRESS, or either before the read_inputs( ) operation or after the write_outputs( ) operation has been called on the corresponding ServerRequest-Callback instance, results in a CORBA::BAD_INV_ORDER_exception.

The set_exception( ) operation sets the value of the read only status attribute to REQUEST_USER_EXCEPTION if its system parameter is FALSE, or to REQUEST SYSTEM EXCEPTION if its system parameter is TRUE. It also sets the value of the read only except attribute to the exception stored in its except parameter. If the system parameter is TRUE, the except parameter contains a system exception, and if it is FALSE, the except parameter contains one of the user exceptions specified in the IDL definition of the operation being invoked. An illegal except parameter value results in undefined behavior. Calling set_exception( ) after the write_outputs( ) operation has been called on _the corresponding ServerRequestCallback instance results in a CORBA::BAD INV_ORDER exception. The any passed as the except parameter is not copied, and remains valid until write outputs( ) has been called on the associated ServerRequestCallback instance and has returned.

The set_forward_ior( ) operation sets the value of the read only status attribute to REQUEST_LOCATION_FORWARD if its permanent parameter is FALSE, and to REQUEST_LOCATION_FORWARD PERM if its permanent parameter is TRUE. It also sets the value of the read only forward_ior attribute to the value of the ior parameter. Passing a nil ior parameter results in a CORBA::BAD PARAM exception. The IOR passed as the ior parameter is not duplicated, and remains valid until write_outputs( ) has been called on the associated ServerRequestCallback instance and has returned. Transport protocols or versions thereof that do not support the notion of permanent location forwarding should treat REQUEST_LOCATION_FORWARD_PERM as REQUEST_LOCATION_FORWARD.

(3) The ServerLocateRequestData Interface

Transport plug-ins provide locality constrained implementations of the ART_Binding::ServerLocateRequestData interface, defined by the following IDL, that provides interceptors access to the state associated with a received locate request:

```
module ART_Binding
{
    enum ServerLocateRequestStatus
    {
        LOCATE IN PROGRESS,
        LOCATE_UNKNOWN_OBJECT,
        LOCATE_OBJECT_HERE,
        LOCATE_OBJECT_FORWARD,
        LOCATE_OBJECT_FORWARD_PERM,
        LOCATE_SYSTEM_EXCEPTION
    };
    interface ServerLocateRequestOata
    {
        read only attribute CORBA::ORB orb;
        read only attribute CORBA::OctetSeq object_key;
        read only attribute ThreadContext thread_context;
        read only attribute ServerLocateRequestStatus status;
        read only attribute any except;
        read only attribute ART_IOR::IOR forward ior;
        void
        set_object_here( );
        void
        set_unknown_object( );
        void
        set_exception(
            in any except
        );
        void
        set_forward_ior(
            in ART_IOR::IOR ior,
            in boolean permanent
        );
    };
};
```

The ServerLocateRequestData interface is similar to the ServerRequestData interface used for normal requests, which is described above. It follows the same non-standard C++ memory management rules, its life span is controlled in substantially the same way, and the same substantially concurrency considerations apply.

The orb and object_key attributes behave identically to these attributes of the ServerRequestData interface. The thread_context attribute is also substantially similar, except that there are no ServiceContextLists available to propagate service-specific state.

The read only status attribute indicates the outcome of the locate request. Its accessor can be called at any time. Its value is initially LOCATE_IN_PROGRESS, but it is modified, before write_outputs( ) is called on the corresponding ServerRequestCallback, by calling one or more of the set_object_here( ), set_unknown_object( ), set_exception( ), or set_forward_ior( ) operations as described below.

The read only except attribute provides access to an any holding an exception to be returned from the locate request being processed. Calling the except accessor when the status attribute has a value other LOCATE_SYSTEM_EXCEPTION will result in nil pointer being returned. The accessor can be called at any time, and the result is not released.

The read only forward_ior attribute provides access to an ART_IOR::IOR instance to which the client should be redirected in order to invoke operations on the target object. Calling the forward_ior accessor when the status attribute has a value other than LOCATE_OBJECT_FORWARD or LOCATE_OBJECT_FORWARD_PERM will result in a nil reference being returned. The accessor can be called at any time and the result is not released.

The except and forward_ior accessors can raise BAD_INV_ORDER if status is not correct instead of returning nil.

The set_object_here( ) operation sets the value of the read only status attribute to LOCATE_OBJECT_HERE. Calling set_object_here( ) when the status attribute has a value other than LOCATE_IN_PROGRESS, or either before the read_inputs( ) operation or after the write_outputs( ) operation has been called on the corresponding ServerRequestCallback instance, results in a CORBA::BAD_INV_ORDER exception.

The set_unknown_object( ) operation sets the value of the read only status attribute to LOCATE_UNKNOWN_OBJECT. Calling set_unknown_object( ) when the status attribute has a value other than LOCATE_IN_PROGRESS, or either before the read_inputs( ) operation or after the write_outputs( ) operation has been called on the corresponding ServerRequestCallback instance, results in a CORBA:BAD_INV_ORDER exception.

A call to read_inputs( ) can either be allowed or required before calling set_object here( ) or set_unknown_object( ) when processing a locate request.

The set_exception( ) operation sets the value of the read only status attribute to LOCATE_SYSTEM EXCEPTION. It also sets the value of the read only except attribute to the exception specified in its except parameter. The except parameter contains a system exception, and an illegal except parameter value results in undefined behavior. Calling set_exception( ) after the write_outputs( ) operation has been called on the corresponding ServerRequestCallback instance results in a CORBA::BAD_INV_ORDER exception. The any passed as the except parameter is not copied, and remains valid until write_outputs( ) has been called on the associated ServerRequestCallback instance and has returned.

The set_forward_ior( ) operation sets the value of the read only status attribute to LOCATE_OBJECT_FORWARD if its permanent parameter is FALSE, and to LOCATE_OBJECT_FORWARD_PERM if its permanent parameter is TRUE. It also sets the value of the read only forward_ior attribute to the value of the ior parameter. Passing a nil ior parameter results in a CORBA::BAD_PARAM exception. The IOR passed as the ior parameter is not duplicated, and remains valid until write_outputs( ) has been called on the associated ServerRequestCallback instance and has returned. Transport protocols or versions thereof that do not support the notion of permanent location forwarding should treat LOCATE_OBJECT_FORWARD_PERM as LOCATE_OBJECT_FORWARD.

(4) The ServerRequestCallback Interface

Transport plug-ins, as well as some ORB service plug-ins, provide locality constrained implementations of the ART Binding::ServerRequestCallback interface, defined by the following IDL:

```
module ART_Binding
{
    interface ServerRequestCallback
    {
        void
        read_inputs ( );
        void
        write_outputs ( );
        void
        complete ( );
    };
};
```

A transport's implementation of the operations on the ART_Binding::ServerRequestCallback interface perform the major steps in processing a received request that takes place after the request header has been read and the request has been dispatched to the appropriate binding. These include reading the remainder of the request message, sending the reply, and cleaning up after processing is complete. An ORB service's implementation of the ServerRequestCallback interface allows it to intercept these actions and observe or influence the outcomes of the requests before delegating back to the ServerRequestCallback instance that it wraps.

Implementations of the ServerRequestCallback interface, including wrappers provided by ServerRequestInterceptor s, do not need to protect themselves against concurrent access. A ServerRequestCallback represents a single invocation. Processing of this invocation is serialized because control is passed serially between ServerRequestInterceptor and ServerRequestCallback instances. Even though they might be invoked in different threads, the calls to the operations of a ServerRequestCallback instance are guaranteed to not overlap in time.

The read_inputs( ) operation is called by a ServerRequestInterceptor, usually the last in the chain, in order to complete processing of the request message. Calling read_inputs( ) more than once, when an associated ServerRequestData's status attribute is not REQUEST_IN_PROGRESS, or when an associated ServerLocateRequestData's status attribute is not LOCATE_IN_PROGRESS, results in a CORBA:BAD_INV_ORDER exception. ServerRequestCallback implementations provided by ORB services delegate the read_inputs( ) operation back to the ServerRequestCallback instances they wrap, unless they are causing an exception to be returned.

When an exception is sent, read_inputs( ) can be called. An interceptor is able to reject a request before the signature is available. Also, read_inputs( ) can be called for locate requests.

The write_outputs( ) operation is called by a ServerRequestInterceptor, again usually the last, in order to indicate that all information needed to send the reply is available in the associated ServerRequestData or ServerLocateRequestData instance, and that the reply should be sent. Calling write_outputs( ) more than once, when an associated ServerRequestData's status attribute is REQUEST_IN_PROGRESS, or when an associated ServerLocateRequestData's status attribute is LOCATE_IN_PROGRESS, results in a CORBA::BAD_INV_ORDER exception. ServerRequestCallback implementations provided by ORB services delegate the write_outputs( ) operation back to the ServerRequestCallback instances they wrap.

The complete( ) operation is called by the last ServerRequestInterceptor to which the ServerRequestCallback was passed, in order to indicate to the transport and to any ORB services that have wrapped the transport's ServerRequestCallback instance, that processing of the request is complete and that no more operations will be called on either that ServerRequestCallback instance, or its associated ServerRequestData or ServerLocateRequestData instance. Calling complete( ) before write_outputs( ) has been called will result in a CORBA::BAD_INV_ORDER exception.

After calling read_inputs( ) on a ServerRequestCallback instance, the last interceptor in the chain checks the status attribute of the associated ServerRequestData or ServerLocateRequestData instance before proceeding to perform the requested operation and/or to call write_outputs( ) on the ServerRequestCallback instance. If the status attribute has been changed by the transport, or by an ORB service's ServerRequestCallback wrapper, to a value other than REQUEST_IN_PROGRESS or LOCATE_IN_PROGRESS, then the last interceptor does not perform the requested operation or call write_outputs( ); it should simply do any necessary cleanup and then call complete( ) on the ServerRequestCallback. Whatever entity(object adapter, ORB service, or transport) changes the status is also responsible for also calling write_outputs( ) Read_inputs( ) can return a value indicating whether write_outputs( ) has already been called so that it is not necessary to examine the status.

It should be noted that the above discussed rules can be changed so that only the last interceptor ever calls write_outputs( ). This may allow all interceptors to intercept all write_outputs( ) calls (5) The ServerRequest Interface Transport plug-ins provide locality-constrained implementations of the ART_Binding::ServerRequest interface, which is defined by the following IDL:

```
module ART Binding
{
    interface ServerRequest
        ServerRequestData,
        ServerRequestCallback
    { };
};
```

It inherits both the ServerRequestData and ServerRequestCallback interfaces. An instance of this interface is constructed by the server side of a transport and passed to the dispatch_request( ) operation of a ServerBinding obtained from the BindingManager in order to dispatch processing of the request to the proper chain of ServerRequestInterceptors. The ServerBinding then passes this ServerRequest instance to the first ServerRequestInterceptor on the chain as separate ServerRequestData and ServerRequestCallback parameters, and processing of the request proceeds.

(6) The ServerLocateRequest Interface

Transport plug-ins for protocols that support locate requests also provide locality-constrained implementations of the ART Binding:ServerLocateRequest interface, which is defined by the following IDL:

```
module ART Binding
{
    interface ServerLocateRequest :
        ServerLocateRequestData,
        ServerRequestCallback
    { };
};
```

It inherits both the ServerLocateRequestData and ServerRequestCallback interfaces. An instance of this interface is constructed by the server side of a transport and passed to the dispatch_locate_request( ) operation of a ServerBinding obtained from the BindingManager in order to dispatch processing of the locate request to the proper chain of ServerRequestInterceptors. The ServerBinding then passes this ServerLocateRequest instance to the first ServerRequestInterceptor on the chain as separate ServerLocateRequestData and ServerRequestCallback parameters, and processing of the locate request proceeds.

(7) The ServerBinding Interface

The ART core provides a locality-constrained implementation of the ART_Binding::ServerBinding interface defined by the following DL:

```
module ART_Binding
{
    interface ServerBinding
    {
        readonly attribute unsigned long active invocations;
        readonly attribute unsigned long total invocations;
        void
        dispatch_request (
            in ServerRequest request
        );
        void
        dispatch_locate_request (
            in serverLocateRequest request
        );
        void
        invocation_complete ( );
        void
        unregister ( );
        boolean
        unregister_if_inactive (
            in unsigned long ignored_activity_count
        );
        void
        set_callback (
            in ServerBindingCallback callback
        );
    };
};
```

The BindingManager creates an instance of the core implementation of the ServerBinding interface when an object adapter plug-in registers a binding, and returns a reference to it to the object adapter so that the object adapter can manage the binding. When a transport plug-in receives a request or a locate request, it obtains a reference to the appropriate ServerBinding instance from the Binding Manager, and uses it to dispatch the request.

The life span of a ServerBinding instance is controlled both by its reference count and by its count of active invocations. When a new instance is created using the BindingManager::register_server_binding( ) operation, the BindingManager holds one reference to the ServerBinding, and the returned ServerBinding reference counts as a second reference. The BindingManager's reference to the ServerBinding is released when the binding is unregistered, and the object adapter also releases its reference at some point. When a reference to a ServerBinding instance is returned to a transport by the BindingManager::start_sarver_invocation( ) operation, the reference count of the ServerBinding is not incremented, and the transport therefore does not release the returned reference; instead, the ServerBinding's count of active invocations is incremented. The ServerBinding is destroyed when both its reference count and its count of active invocations are zero.

The readonly active_invocations attribute indicates how many invocations are currently active on the binding. This count includes both normal requests and locate requests. Note that the count returned from this attribute's accessor is simply a snapshot of the value at the time it was invoked, and other invocations might be dispatched to the binding unless it is unregistered.

The readonly total_invocations attribute provides access to the cumulative count of invocations dispatched to the ServerBinding instance, including both normal requests and locate requests.

Readonly attributes can be provided to ensure access to the object key and interceptor chain.

The dispatch_request( ) operation is called by a transport server to cause a ServerBinding object, obtained from the BindingManager::start_server_invocation( ) operation, to process the received request represented by the ServerRequest instance it passes as the request argument. The dispatch_request( ) operation may return control to the transport server before processing has been completed. Because processing might proceed concurrently in a different thread, the transport server does not manipulate the ServerBinding from the thread in which it called dispatch_request( ) after dispatch_request( ) returns. Any exception thrown by dispatch_request( ) cannot be returned to the client.

The dispatch_locate_request( ) operation is identical to the dispatch_request( ) operation, except that it is used to process locate requests instead of normal requests, and is passed a ServerLocateRequest instance rather than a ServerRequest instance.

The invocation_complete( ) operation is called by the complete( ) method of a transport server's ServerRequest or ServerLocateRequest implementation in order to inform the ServerBinding that processing of a request is finished. This may result in an unregistered ServerBinding being deleted. Therefore, the complete( ) methods of transports' ServerRequest and ServerLocateRequest implementations, and of ORB services' ServerRequestCallback wrapper implementations, do not do anything after complete( ) has been called that would be invalid if the interceptors making up the binding have been deleted.

The unregister( ) operation is called by an object adapter to immediately unregister the ServerBinding with the BindingManager. No further calls to BindingManager:start_server_invocation( ) or BindingManager::get_server_binding( ) will return this ServerBinding. The BindingManager's reference to the ServerBinding will be released, and the ServerBinding will be destroyed when no other references to it exist and its active invocation count is zero.

The unregister_if_inactive( ) operation is similar to the unregister( ) operation, except that no action is taken unless the ServerBinding's active invocation count is less than or equal to the value of the ignored_activity_count parameter. TRUE is returned if the binding is unregistered; otherwise FALSE is returned.

An object adapter can use the ignored_activity_count parameter to allow the binding to be unregistered from within the context of an invocation dispatched to that binding.

The set_callback( ) operation is used by an object adapter to associate an ART_Binding::ServerBindingCallback instance that it implements with the ServerBinding. The ServerBindingCallback interface is described below. Any existing association with a ServerBindingCallback is broken, and its reference is released. The set_callback( ) operation duplicates the reference passed in, and a nil value is legal.

(8) The ServerBindingCallback Interface

Plug-ins implementing object adapters optionally can provide locality-constrained implementations of the ART_Binding::ServerBindingCallback interface defined by the following IDL:

```
module ART_Binding
{
    interface ServerBindingCallback
    {
        void
        binding inactive ();
    };
};
```

If a ServerBindingCallback instance is associated with a ServerBinding, its binding_inactive( ) operation will be called whenever the ServerBinding's active invocation count becomes zero. This call to binding_inactive( ) is made with the mutex protecting the ServerBinding's state unlocked, allowing its implementation to invoke operations that manipulate the ServerBinding. But this also means that the ServerBinding's active invocation count might concurrently become non-zero before or during the execution of binding_inactive( ), so unregister_if_inactive( ) should be used instead of unregister( ) in order to unregister a binding from binding_inactive( ) only if it really is inactive.

It turns out that the ServerBindingCallback functionality is not needed by the current POA implementation. It can be removed. Alternatively, it is not removed if it is generally useful for other object adapters.

(9) BindingManager Operations

The ART_Binding::BindingManager contains the following operations that are used by transport and object adapter plug-ins to manage server-side bindings:

```
module ART Binding
{
    interface BindingManager
    {
I       //...
        // server-side binding management
        readonly attribute unsigned long
active_server_invocations;
        readonly attribute unsigned long
total_server_invocations;
        ServerBinding
        register_server_binding (
            in CORBA::OctetSeq key,
            in ServerRequestInterceptor interceptor,
            in ServerBindingcaliback callback
        );
        ServerBinding // release
        get_server_binding (
            in CORBA::OctetSeq key
        );
        ServerBinding // don't release, call
```

```
-continued invocation_complete
        start_server_invocation(
                in CORBA::OctetSeq key
        );
        // object_key manipulation
        void
        append object key segment
                inout CORBA::OctetSeq object_key,
                in CORBA::OctetSeq segment_data
        );
        void
        parse object key_segment (
                in CORBA::OctetSeq object_key,
                in unsigned long offset, // offset into
object_key
                out unsigned long segment data_start,
                out unsigned long segment data_length
        );
        void
        find object key_segment (
                in CORBA::OctetSeq object_key,
                in unsigned long index, // segment number
                out unsigned long segment_data_start,
                out unsigned long segment_data_length
        );
        //...
};
```

The ART core provides a locality-constrained BindingManager instance for each ORB instance. The BindingManager supports server-side binding by maintaining a table that maps complete or partial object keys to ServerBinding instances. It also keeps an overall count of active server-side invocations that have been dispatched to those ServerBindings.

The readonly active_server_invocations attribute indicates how many server-side invocations are currently active on the ORB. This count includes both normal requests and locate requests. Note that the count returned from this attribute's accessor is simply a snapshot of the value at the time it was invoked.

The readonly total_server_invocations attribute provides access to a cumulative count of invocations dispatched by the ORB, including both normnal requests and locate requests.

The register_server binding( ) operation is called by an object adapter to create and register a ServerBinding instance associating the chain of ServerRequestInterceptor s specified via the interceptor parameter and the ServerBindingCallback instance specified by the callback parameter with the full or partial object key specified by the key parameter. It returns a reference to that ServerBinding, which is eventually released by the object adapter. If successful, the interceptor and callback parameters are duplicated, and the key parameter is copied. A nil interceptor parameter results in a CORBA::BAD PARAM exception, while a nil callback parameter is acceptable.

If a binding is already registered under the full or partial object key specified by the key parameter, CORBA::BAD_INV_ORDER is raised. If the key parameter does not conform to the ART object key segmentation syntax, CORBA::INV OBJREF is raised.

Unsegmented string object keys for Interoperable Naming specification can also be supported.

The get_server_binding( ) operation finds the ServerBinding that would be returned from start_server invocation( ) given the same key parameter, and duplicates and returns its reference. If there is no full or partial match, a nil reference is returned.

A boolean parameter, that, if set, would require an exact match can also be provided.

The start_server_invocation( ) operation is called by a transport server in order to obtain the ServerBinding instance that will be used to dispatch a received normal request or locate request. The transport passes the received object key as the key parameter. The BindingManager finds the registered ServerBinding whose object key best matches the specified object key, increments its active invocation count, and returns its reference to the transport. The transport calls invocation_complete( ) on the returned ServerBinding after processing of the request by the ServerBinding's interceptor chain is complete, and does not release the returned reference. If there is no registered ServerBinding that completely or partially matches the specified object key, a reference is returned to a special ServerBinding instance whose dispatch_request( ) implementation sets the CORBA::OBJECT_NOT_EXIST exception on the ServerRequest passed to it, and whose dispatch_locate_request( ) implementation calls set_unknown_object( ) on the ServerLocateRequest passed to it. If the key parameter does not conform to the ART object key segmentation syntax, start_server_invocation( ) raises CORBA::INV_OBJREF.

The append_object_key_segment( ) operation is used by object adapter plug-ins and associated location daemon functionality to construct object keys that conform to the ART object key segmentation syntax. The octet sequence passed as the segment_data parameter is encoded as a segment and appended to the octet sequence provided as the object_key parameter. Note that in the C++ implementation of this operation, the inout object_key parameter is modified and not replaced, so performance can be optimized by constructing this octet sequence with a large enough buffer to hold typical object keys.

The parse_object_key_segment( ) operation is used by object adapter plug-ins, and associated location daemon functionality to decode object keys that conform to the ART object key segmentation syntax. It decodes the encoded segment beginning at the offset indicated by the offset parameter in the octet sequence passed as the object_key parameter. Upon return, the segment_data_start out parameter indicates the offset into object_key at which the actual segment data begins, and the segment_data_length out parameter indicates the length of the actual segment data. If the object_key parameter data at the indicated offset does not conform to the ART object key segmentation syntax, CORBA::INV_OBJREF is raised.

The find_object_key_segment( ) operation is similar to the parse_object_key_segment( ) operation, but provides random rather than sequential access to the segments of an encoded object key. It decodes the Nth encoded segment of the object_key parameter, where N is specified by the index parameter. An index of zero specifies the initial segment, and is equivalent to calling parse object_key_segment( ) with an offset of zero. Note that the ART segmentation format does not support true random access, but using the find_object_key_segment( ) operation to access a single segment is slightly more efficient than using an equivalent series of parse_object key_segment( ) calls.

30 2. Dynamic Server Interface

This section describes support the ART core provides for an object adapter's DSI and skeleton implementations. It extends the standard CORBA::ServerRequest interface to improve performance, and provides an implementation of this extended interface in terms of the internal ART_Binding::ServerRequestData and ART Binding::ServerRequestCallback interfaces described above.

(1) The CORBA::ServerRequest Interface

ART extends the standard CORBA::ServerRequest interface in order to provide more flexible and efficient memory management for DSI-based object implementations and for DSI-based static skeletons, such as those used by the ART POA, that are based on CORBA::ServerRequest. The extensions allow the object implementation to determine whether argument and result storage has been provided by the client, and, if not, allow it to allocate them, and the values they contain, on the stack rather than the heap. The extended CORBA::ServerRequest interface is defined by the following IDL:

```
module CORBA
{
    interface ServerRequest
    {
        readonly attribute Identifier operation;
        void
        arguments (
            inout NVList nv
        );
        Context
        ctx ();
        void
        set_result (
            in any val
        );
        void
        set_exception (
            in any val
        );
        readonly attribute ORB it_orb;
        boolean
        it_setup (
            out NVList arguments,
            out any result
        );
        void
        it_respond ();
    };
};
```

The operation attribute and the arguments( ), ctx( ), set_result( ), and set_exception( ) operations all behave exactly as specified in CORBA if the it_setup( ) operation has not been previously called on the ServerRequest instance. If it_setup( ) has been called, their behavior is modified as described below.

The readonly it_orb attribute provides access to the CORBA::ORB instance that received the request. Its accessor can be called at any time, and the result is not released.

Calling the it_setup( ) operation before calling other CORBA::ServerRequest operations modifies management of the argument and result memory for the ServerRequest. If it_setup( ) is not called, the ServerRequest is responsible for releasing any CORBA::NVList pointer passed in to the arguments( ) operation, the DIR (Dynamic Implementation Routine; i.e., the DSI-based method or skeleton) is prepared for arguments( ) to return a different NVList, and the ServerRequest copies the Any passed to set_result( ). If the DIR calls it_setup( ), the normal memory management rules are modified as describe here, and depend on whether it_setup( ) returns TRUE or FALSE. If it_setup( ) returns TRUE, initialized argument and result storage already exists for the request, such as when a collocated client has supplied it, and is returned to the DIR via the arguments and result out parameters, which are not released. In this case, if the DIR calls arguments( ) or set_result( ), a CORBA::BAD_INV_ORDER exception will be raised. If it_setup( ) returns FALSE, initialized argument and result storage is not available, and the DIR calls arguments( ) and may call set_result( ) as usual. In this case, arguments( ) and set_result( ) do not adopt or copy the parameters passed to them, which are expected to remain valid until the required call to it_respond( ) is made, and arguments( ) is guaranteed not to return a different NVList. Note that management of the memory passed to set_exception( ) is not effected by calling it_setup( ). Calling it_setup( ) after having previously called it_setup( ), arguments( ), ctx( ), set_result( ), or set_exception( ) will result in a CORBA::BAD_INV_ORDER exception.

The it_respond( ) operation signals to the ServerRequest that the out and inout arguments and result, or else an exception, are ready to be sent to the client. If it_setup( ) was previously called and returned TRUE, any storage passed in via arguments( ) or set_result( ) can then be freed once it_respond( ) returns. Calling it_respond( ) before either it_setup( ) was called and returned TRUE, or arguments( ) or set_exception( ) was called, will result in a CORBA::BAD_INV_ORDER exception, as will calling it more than once.

(2) The ART_ServerRequestImpl Class

The ART core provides a concrete C++ class implementing the CORBA::ServerRequest interface with the following public members:

```
class IT_ART_API ART_ServerRequestImpl
    public CORBA: :ServerRequest,
    public ITCxxDOAServantBase
{
public:
    ART_ServerRequest Impl
        ART_Binding::ServerRequestData_ptr data,
        ART_Binding: :ServerRequestCallback_ptr callback
    );
    ~ART_ServerRequest Impl 0;
    const char*
    operation () const;
    void
    arguments (
        CORBA::NVList_ptr& parameters
    );
    CORBA: :Context_ptr
    ctx ();
    void
    set_result (
        const CORBA: :Any& val
    );
    void
    set_exception (
        const CORBA: :Any& val
    );
    CORBA::ORB_ptr
    it_orb ();
    CORBA: :Boolean
    it_setup (
        CORBA: :NVList_out arguments,
        CORBA: :Any out result
    );
    void
    it respond();
};
```

The constructor and destructor of the ART_ServerRequestImpl class are public, allowing an object adapter to allocate instances on the stack or as members of other data structures. An object adapter's ServerRequestInterceptor creates an instance of the ART_ServerRequestImpl class, passing the ServerRequestData and ServerRequest- Callback references to the public constructor. It then passes the ART_ServerRequestImpl pointer as a CORBA::ServerRequest reference to the DSI or skeleton based servant that is responsible for performing the requested operation. The ART_ServerRequestImpl instance with then take care of making all required calls on the ServerRequestData and ServerRequestCallback instances passed to its constructor. The interceptor can assume that write_outputs( ) has been called on the ServerRequestCallback by the time the class instance has been destroyed. The ART_ServerRequestImpl class does not call complete( ) on the ServerRequestCallback, leaving that to the object adapter implementation.

The object adapter registers an instance of its own ServerRequestInterceptor implementation. The BindingManager can be configured to allow other ORB services to have their interceptors included.

In addition to ensuring that the proper interceptors are included in service-side bindings, the ORB also ensures that the proper IOR profiles and components are included in generated object references. This may involve the BindingManager.

The DSI servant is not required to check if an exception has been set after calling CORBA::ServerRequest::arguments( ). However, an exception can be raised here. The servant then may try and set that exception on the ServerRequest.

A WorkQueue can be passed along so that the correct thread pool is used. This should also be made available to message-level interceptors if they can determine the correct threading policy.

Per-connection server bindings can also be provided. This would be more symmetric with the client side, and would allow ServerRequestInterceptors to maintain connection-specific state.

It should also be noted that the order in which server side interceptors are logically chained together can be reversed. If the OA interceptor received control first, it would make read_inputs( ) and write_outputs( ) calls that are what need to be intercepted. This might eliminate the overhead of the invoke( ) call and return, and much of the threading. In exchange, the ability to "intercept" a request before application code got called can be lost, since read_inputs( ) cannot be called until the DSI has supplied the NVList.

IV. GIOP Plug-in

This section describes the architectural design of the GIOP transport plug-in, and relevant interfaces for the GIOP based message interceptors.

In particular, this section describes the ART framework for representing GIOP based transports in ART. This is based on the most recent GIOP 1.0, 1.1 and 1.2 OMG specification described in CORBA 2.3, chapter 12, "General Inter-ORB Protocol". GIOP essentially defines message formats, data marshalling and general connection assumptions for connection oriented transports. The only current mapping of GIOP is the OMG specified IIOP protocol for mapping GIOP messages over the TCP/IP transport. The specification also defines agent roles for client and server side endpoints of a given connection ART defines a general Plug-In interface for registering plug-ins with the ORB. The GIOP and IIOP plug-ins are the default plug-ins for ART. Both plug-ins are provided as dynamic libraries and may optionally be loaded and registered with the ORB depending on per ORB configuration settings. ART will also provide a plug-in developers kit (PDK) which enables plug-in developers to implement and deploy specialized request and message interceptor plug-ins.

The ART architecture defines Request level interceptor interfaces which determine how the request interceptor chain is established during the binding process. These interfaces also define how request processing is initialized and passed between request interceptors, as detailed in the above sections and only mentioned in this section where relevant to the message interceptor interfaces. The ART_GIOP IDL interface defines the message level interceptor interface for GIOP based message interceptors. The message interceptor chain lies between the request interceptor chain and the network and specifically provide for stacking of protocols between Request level interceptors and the network. There are three generally described roles a message interceptor plays in the binding. Message interceptors act either as a link between request and message level interceptor chains, implemented by the GIOP plug-in described here, as intermediate message interceptors for processing or examining message data, or as connection interceptors which are placed closest to the network and act as both message interceptor and event handlers specific to an open connection.

The ART GIOP plug-in provides for full CORBA defined GIOP connection usage. Connections will be fully shareable by multiple client objects, both IIOP and SECP. Synchronous, deferred synchronous and full asynchronous messaging are also supported. Asynchronous messaging however, is not specified here in detail until the OMG has standardized the specification.

The CORBA GIOP 1.0, 1.1 and 1.2 revisions are supported. With the 1.1 (and higher) revisions, message fragmentation is possible and 1.2 specifically allows interleaving of fragments with the 1.2 defined fragment header containing a request id. The implementation details of the various protocol revisions are contained within the GIOP plug-in and are not exposed to the message interceptor interfaces. Instead, marshalled data is represented as basic octet sequences which are passed through the message interceptor chain.

The present invention is described with an assumption of knowledge of the CORBA 2.3 GIOP specification for message formats, CDR coding rules and general connection semantics.

The following are some features provided in the ART GIOP plug-in design of the present invention:

facilitate the needs of the ART core Binding and Interceptor interfaces fits cleanly into the Request level interceptor design support for multiple protocol versions connection sharing between multiple client bindings allow a protocol stack of straight GIOP and GIOP derived protocols.

efficient connection establishment and management general access to the transport plug-in from services 1. Design Overview (1) Message Interceptors Client side bindings are established with target objects through the ART Binding interface which establishes a chain of request and message-level interceptors to represent a binding, or channel of communication between client and server. The Binding interface described above is primarily directed to request level interceptors while this section describes message-level, GIOP protocol specific, interceptors.

A protocol stack is related to the message interceptors instantiated for a given binding.

Message interceptors are described in terms of protocols and connections. For example, GIOP and SECIOP message interceptors control the inter-ORB protocol semantics and syntax for message transmission while the IIOP message interceptor controls both the physical TCP/IP connection and the multiplexing of incoming messages to GIOP or SECIOP message interceptors. There is a one-to-many relationship between the connection interceptors and SECIOP/GIOP interceptors, and between SECIOP and GIOP interceptors, so that multiple bindings may make use of the same connection with a unique set of participating interceptors for each.

Message interceptors are preferably created using a bottom-up binding model. Interceptors closest to the connection are created first followed by each subsequent interceptor towards the request level interceptor. The immediate advantage of this model is that connections are established prior to the marshalling and attempted transmission of request data.

Data is passed between message interceptors as (raw) data buffers, typically containing a complete GIOP message or message fragment possibly encapsulated in some higher level protocol (such as SECIOP). Each data block will always contain the 12 byte GIOP header structure including magic string and message size in fixed locations (note also that the SEC-IIOP header is designed to match the GIOP header in this way). Buffer management is provided by the interceptor closest to the network and is described in a later section.

(2) Message Interceptors and Factories

The message interceptors are constructed and assembled into chains in a similar way to the request interceptors during the binding process. The ART_GIOP module defines IDL interfaces derived from the ART_Binding interfaces as follows:

```
module ART_GIOP
(
    typedef sequence<octet> Data;
    interface ClientMessageInterceptor
        : ART_Binding::ClientInterceptor
        readonly attribute request_Id;
        enum BlockState
        (
            BeginBlock, EndBlock, IgnoreBlock
        );
        send_message(
            in ClientMessageInterceptor prev_interceptor
            in Data              message_data,
            in BlockState        block_state
        );
        push_message (
            inout Data message_data
        );
        void
        register_interceptor (
            in Client MessageInterceptor interceptor
        );
        void
        unregister_interceptor(
            in Client MessageInterceptor interceptor
        );
        boolean
        version(
            in ART_IOR::ObjectKeyProfile profile,
            out GIOP::Version giop_version
        );
    );
);
```

The ClientMessageInterceptor interface is in fact used for both client and server side binding chains. Beyond the IA release this interface will be simply a MessageInterceptor.

The basic data type ART_GIOP::Data is used to pass message data between message interceptors as a sequence of octets. There is no requirement for any specific message interceptor to have knowledge of the message content represented in the sequence data.

The request_id attribute holds the next unique message identifier which is allocated and returned by the connection level interceptor with each access to the value. These values are unique per connection and protocol (magic) and used to match request messages to corresponding replies.

A BlockState is also defined primarily for 1.1 fragmentation support. With 1.1 GIOP, fragments do not define a fragment header containing a request id which prevents fragments from multiple Request/Reply messages being interleaved over a single connection. A block state is maintained by the connection interceptor and threads attempting to send a 1.1 fragmented message first sets the state to BeginBlock in order to obtain a logical block on the connection. Other 1.1 fragmented messages will be blocked until the state is set to EndBlock indicating the final fragment has been sent and the lock released. Messages which are non fragmented, or any GIOP messages other than 1.1 fragments, will specify an IgnoreBlock state allowing these to be freely intermixed with the 1.1 fragments.

The behavior for non blocking invocations will require the queuing of 1.1 fragmented messages awaiting the release of the block state. Future QoS requirements will also effect the behavior for high priority fragmented messages. The current thread holding a 1.1 fragmentation block may be canceled via a CancelRequest message and the blocked state given to the higher priority thread.

(a) GIOP and IIOP Versions

The CORBA GIOP version is determined from the version of the transport profile used for the binding. The ART_GIOP::ClientMessageInterceptor::version( ) operation is provided in order for the connection interceptor to indicate the GIOP version relevant to the transport specific profile. Intermediate message interceptors, such as a secure IOP (SECIOP) interceptor, also make use of the GIOP version determined by the connection interceptor to map this to it's own protocol version.

(b) Factory Implementations

The transport plug-ins provide direct implementations of the ART_Binding::ClientInterceptorFactory interface. The ART_BindingManager calls each of these factories in turn when creating the message interceptor chain by passing the previously established message interceptor reference to the factory, and obtaining a message interceptor back.

Each message interceptor factory's ART_Binding::ClientInterceptorFactory::getinterceptor( ) implementation is called in order to determine if the plug-in will participate in the binding. If so, the factory either creates a new interceptor specific to the policies and profile passed to it, or returns an existing interceptor already matching the policies and profile. If the plug-in will not participate in the binding, the interceptor passed to it will be returned. Since each factory may return a newly created interceptor with each call, there is a one-to-many relationship from the connection interceptors closest to the network up to the message request interceptors.

Currently a GIOP interceptor is created only when it's factory does not hold a reference to the previous interceptor passed to it. This results in a one-to-one relationship with no requirement for each interceptor beyond the connection interceptor to de-multiplex messages. The issue is that interceptor defined mutexes are used for all bindings sharing the chain and a new chain established for any bindings requiring additional or alternative inteceptors. To provide maximum scaleability requires the one-to-many relationship described here.

The interceptor factories are called by the binding manager in a specific order, from the connection interceptor factory up towards the request level chain. Each interceptor will hold a reference to the next interceptor (passed to it through get_interceptor( )) in the chain (closer to the network) although a link is required in the reverse direction for passing incoming message data up the chain. For this reason, the ART_GIOP::ClientMessageInterceptor::register interceptor operation is defined. When the plug-in's factory first creates each interceptor, the interceptor stores the references to the previous interceptor and then registers itself with the previous interceptor. The previous interceptor maintains a table of references for each interceptor linked to it.

Similarly, the interceptor preferably invokes the unregister interceptor( ) operation when the last reference to the interceptor is released either because all bindings are closed for the open connection or as part of a plug-in shutdown sequence. The interceptor may also un-register itself during the initial binding phase. Within the GIOP plug-in, for example, with each new binding the message interceptor factory first verifies the target object is reachable by sending a LocateRequest message to the server. If the reply results in a location forward or the object is unknown to the server, the reference count for the interceptor is released by the factory and the LOCATION_FORWARD or UNKNOWN_OBJECT exception returned to the binding manager. If no other references to the interceptor are held, the interceptor will un-register itself with it's factory and then be destroyed.

(c) Message Interceptors

If present in the binding, multiple message interceptors may be placed between the GIOP interceptor and the ConnectionInterceptor participating in the binding. The message interceptor may play various roles in the binding chain such as monitoring of data, logging activities, message snooping etc. They may also implement other protocols on top of the GIOP protocol such as a SECIOP message interceptor which encrypts GIOP messages within SECP messages in order to implement message level secure IIOP connections. In this way, the ART GIOP design provides for flexible protocol stacks represented as interceptor chains.

(d) Message Request Interceptors

```
        module ART_GIOP
(
    interface MessageRequestInterceptor
        : ClientMessageInterceptor,
          ART_Binding::ClientRequestInterceptor
    (
    );
);
```

The GIOP plug-in defines an implementation of the ART_GIOP::MessageRequestInterceptor and is the outer most of the message-level interceptors. It controls GIOP message creation and processing, and fragmentation as defined for GIOP versions 1.1 and higher. Object location (via LocateRequest/LocateReply messages) is also handled by the GIOP message interceptor, in conjunction with the ART core so that the Binding and IOR_Proxy interfaces, also involved in object location, may forward the client to a location through another (possibly non-GIOP) protocol.

The GIOP interceptor translates request level data passed through calls to invoke( ), send_async( ) and send_deferred( ) operations, defined by the ART_Binding::ClientRequestInterceptor, to GIOP message data transferred via the message interceptor chain. The invoke( ) operation marshals ClientRequest data including Request parameters and service contexts into CDR encoded buffers which is then transferred between message interceptors via the ART_GIOP::ClientMessageInterceptor::send_message( ) operation.

(e) Connection Interceptors

In ART terms, a ConnectionInterceptor is described as a transport message interceptor which implements a specific transport mapping of the GIOP protocol. The IIOP plug-in is the only defined GIOP mapping currently defined by CORBA for TCP/IP based inter-ORB communications.

```
module ART_GIOP
(
    interface MessageRequestInterceptor
        : ClientMessageInterceptor,
          ART_EventHandler
    (
    );
);
```

An ART_GIOP::ConnectionInterceptor implementation maintains an open connection over which protocol specific messages are transmitted. Event handling and de-multiplexing and message dispatch of incoming messages is also controlled by the interceptor. Only an IIOP message interceptor is described here, although any connection oriented transport could be mapped to GIOP and a corresponding connection interceptor defined. For example, ART support for Asynchronous Transfer Mode (ATM), Signaling System number 7 (SS7) and other transports/protocols as well as a specialized shared memory IIOP plug-in implementation is contemplated within this invention.

Alternative transport protocol implementations can also be defined such as for IIOP, where a generic socket layer is required to implement both standard socket communications and specific SSL support.

Input Handler

The ART_EventHandler interface defines general operations which are handlers implemented by the connection interceptor, including handle_input, handle_exception, handle_close and so on. The connection interceptors are free to adopt any event handling model although ART defines a default ART_Reactor implementation which the C++ based plug-ins implement, while the java implementations make use of a proactor.

Note that in order to provide a consistent model for all native ART ORB implementations, it is likely that the proactor model be adopted for the C++ based ORB. For the current ART implementation, the Reactor pattern is assumed.

As mentioned, implementations of an ART_GIOP::ConnectionInterceptor act both as a message interceptor and an event handler for the connection by providing implementations of the derived ART_EventHandler operations.

For the client side binding, a message interceptor chain is created with the connection message interceptor being registered with the event handler. When incoming message data arrives, the event handler fires and a call made to the handle_input method for the interceptor instance responsible for the connection handle (open socket in the case of the IIOP interceptor). Once the incoming data has been read, the message is demultiplexed based on the magic string and passed to the relevant interceptor chain via the push_message operation defined by the ART_GIOP::MessageInterceptor interface.

The server side implementation is similar to the event handling mechanism used by the client for established connections. The difference is an additional listen handler which initiates the creation of the message interceptor chain with each new connection accepted from a client. The IIOP plug-in implements a ART_IIOPListenHandler object derived from the ART_EventHandler interface and registers an instance of the object with the event handler for each published IOR transport profile. When the handle_input method is called for the listen handler, the connection is accepted and a new IIOP ConnectionInterceptor created for the binding. The new interceptor is then registered with the event handler to allow handling of incoming message data in a similar way as described for the client. The listen handler then returns to the event handler and is activated with subsequent connection attempts.

A general requirement is that ART_EventHandler implementations are non-blocking in nature when using the default ART_Reactor event handler. When the reactor fires, the registered handler is activated within the reactors thread and performs non blocking reads of the message data so that no delay occurs in returning control to the reactor in order to process any events for other connections. As such, the handler may be activated multiple times for each incoming message before passing the complete message to the message interceptor chain. A complete message in this sense is the GIOP header and message size bytes making up a GIOP message fragment. The same requirement applies at this point and the push message call remains non-blocking by avoiding any processing of the message data. The message is instead placed on a queue and processed within a work queue thread.

(f) Buffer and Memory Management

The GIOP plug-in provides implementations of the ART_CDR:InStream and OutStream interfaces for marshalling GIOP message data. Allocated buffer space is used within the GIOP streams implementations for containing marshalled message data which is passed as raw message data between message interceptors involved in the binding. Buffer management is required to allocate, manage and free buffer resources and is controlled by the connection interceptor implementation. In this way, transport specific requirements determine the allocation and management requirements for buffer space used by all interceptors in the chain. The buffer allocation and de-allocation calls defined by the ART_GIOP follows:

```
module ART_GIOP
(
    typedef sequence<octet> Data;
    interface ClientMessageInterceptor
        : ART_Binding::ClientInterceptor
    (
        Data
        alloc_buffer (in unsigned long minimum_size);
        Data
        realloc_buffer(
            in Data buffer, in unsigned long minimum_size
        );
        void
        free_buffer (in Data buffer);
    )
)
```

When message data is read from the connection it is placed in a buffer allocated by the connection interceptor implementation. The IIOP plug-in uses the default sequence allocbuf method defined in the sequence support code implemented by the core. Once a complete message fragment has been read the memory buffer is used to create an ART_GIOP::Data sequence which is then passed up the interceptor chain. Buffer ownership rules are those defined by the C++ sequence mapping and determined by the plug-in. If the sequence is created as releasable (specifying true as the release parameter passed to the constructor), a subsequent interceptor may take ownership of the raw sequence buffer by a get_buffer(true) call which returns a pointer to the buffer and releases ownership to the caller. This is possible because the data sequence parameter for push_message is defined as inout.

Each interceptors send_message( ) implementation allocates buffer space through calls to the ART::GIOP::MessageInterceptor::alloc_buffer( ) operation. This calls down the chain to the connection interceptor which returns an allocated Data sequence containing the required buffer space. This buffer is used by the GIOP message request interceptor to marshall the Request data and pass completed message fragments down the chain by calling the next interceptor send_message( ). Buffer space is de-allocated depending on the BufferLifespan configuration setting (described below) which either returns buffer space via free_buffer( ) calls after each fragment is sent, if a PerFragment setting, or reused for each fragment and returned once the complete Request or Reply has been sent (with the PerMessage setting). The former may be appropriate to transport implementations such as a shared memory transport with severe resource constraints.

2. Plug-in Initialization and Shutdown

Plug-ins are listed in the configuration file and dynamically linked during ORB initialization. For each ORB instance created within a process, the plug-in maintains a per ORB state containing all data and references required for the ORB instance and it's specific configuration domain. This state is created by calls to the plug-in ART_PlugIn::ORB_init operation.

When creating a per ORB state, the GIOP and IIOP plug-ins each resolve initial references to the configuration manager, IOR manager, binding manager and any other required references. Instances of their respective message interceptor factories are also created, and the GIOP state also contains a reference to the per ORB work queue used for executing incoming GIOP work items. The per ORB state reference is passed between a plug-in's objects to provide access to referenced interfaces without having to resolve these references during processing time.

The plug-in interface also implements a two phase shutdown sequence to ensure graceful and order independent shutdown of the plug-ins through the PlugInORBState::shutdown_phase1 and shutdown_phase2 operations. During the first phase, all external references may be used to flush work queues, interact with the binding manager to unregister factories and prevent further bindings being established, unregister handlers with the reactor and so on. All external references are finally released to facilitate final shutdown. During the second shutdown phase, no further external references are assumed to be valid. The plug-ins release all resources they hold, close connections and cease further processing. The per ORB state is then destroyed along with all objects it created during initialization.

3. Interceptor Binding and Invocation

Binding is described here in terms of the ordered creation and linking together of message interceptors. Interceptors are created from the bottom level (closest to the network) up to the top level (closest to the Request level interceptor chain).

The order the interceptors are placed into the chain and any dependencies on other plug-ins are indicated in the configuration file for the given domain. The binding manager in turn uses this information to determine the order in which interceptors are created and placed in the message interceptor chain for both the request and message interceptor chains.

The message interceptor implementations are symmetrical, being used for both the client and server side chains such that a binding results in a message interceptor chain in the client and similar chain in the server. Each interceptor chain may also assume both a client and server role for use with bidirectional GIOP connections. Event handling is also similar in client and server, with the same defined connection interceptor registered with the ART event handling interface.

(1) Client Side Message Interceptors

The creation of a client side interceptor chain is controlled by the binding manager in the same way for both message and request level interceptor chains. The chain is constructed outwards from the network level as an ordered binding process to establish a valid binding with minimal effort to tear down and recreate chains with each binding failure. The connection message interceptor first ensures the IOR profile enables an open connection to be established. Successive profiles will be used by the binding manager until either a connection is accepted or the target object is found to be unreachable.

Once a connection is open to the server, control returns to the binding manager to complete the chain up to the GIOP interceptor. Through the GIOP interceptor factory, the server implementation for the target object is verified through a LocateRequest before returning to the binding manager to complete the Request interceptor chain. The task of locating of the object is performed with every new binding regardless of whether a new connection has been established or an existing connection is being shared to the server. If the client is forwarded to an alternative location, this is indicated to the binding manager and binding process is restarted using the new (forward) object reference. The client may be forwarded multiple times in this way. Once a target object implementation is located, the message interceptor chain is complete and the binding manager continues with establishing the associated request level interceptor chain after which invocations may commence for the target object.

Synchronous Invocation

Request-level interceptors are then called and the skeleton or DSI servant is activated.

(2) Server Side Message Interceptors

A defined interface to establish server side bindings can be provided. When a client initiates a connection attempt with the server, the server side listen handler fires and the connection is accepted. The listen handler creates a connection interceptor, passing it the service endpoint manager reference, and registers the interceptor as a message event handler with the Reactor. When a message first arrives, the LIOP connection interceptor simply creates a GIOP interceptor instance via the GIOP interceptor factory and calls the GIOP interceptor push_message with the message data.

In order to create an arbitrary interceptor chain similar to the client chain requires the IIOP interceptor to initiate a server side binding with the BindingManager.

When a Request message arrives, the server side GIOP interceptor creates a GIOP work item and queues the item in the per ORB automatic work queue for processing by a work thread from the queue's thread pool. The non_blocking push message method then returns and control is passed back to the event handler for the next message. The GIOP work item is then dequeued by the work queue thread and processed by a call to the work item's execute method. A GIOP ServerRequest is created for the Request (or a ServerLocateRequest for a LocateRequest message) containing the unmarshalled message data.

A server invocation is initiated by calling the ART_Binding::BindingManager::start_server_invocation method passing the object key obtained from the request. The ServerRequest is then passed to the ART_Binding::BindingManager::dispatch_request method which may process the request or queue the request and return immediately. As such the ServerRequest is not deleted by the work item. After the request has been processed, the results, out/inout parameters and return value are set within the request. Only after the ServerRequest::write_outputs method has been invoked to reply with these values to the client and the request and its data are no longer in use, the ServerRequest::completed method is called to indicate the ServerRequest implementation may delete itself completely.

(a) Endpoints

The ART architecture defines objects which share a common binding, through common policies and which coexist within the same ORB process, as grouped within a single endpoint. If the IOR profile contains a TAG_ENDPOINT_ID_LOCATION component, this indicates the portion of the object key which contains the endpoint_id and hence which endpoint the object belongs to. The client can use this in turn to determine the binding (new or existing) required for an unbound object by having knowledge of the bindings shared by multiple objects. Grouping objects into endpoints in this way optimizes both the IOR representation and the client's binding process.

(b) Service and ServiceEndpointManagers

In order to be involved in the creation of new IORs, the server side connection interceptor plug-in provides an implementation of the ART_IOR::Service interface which is registered with the IORManager.

4. Threading and Message Queuing

Another aspect of the IIOP connection interceptor plug-in interceptors is the ability to optimize the efficiency of event handling (particularly reading and queuing of messages) and message processing.

5. Plug-in Configuration

The ART configuration interface allows configuration settings to be defined within specific domain scopes. The GIOP plug-in defines a GIOP scope within which settings are specified which effect either the GIOP plug-in behavior directly, or may optionally be used by other GIOP based plug-ins to determine their own behavior.

The GIOP configuration scope does not act as a parent scope to other GIOP based plug-ins such as IIOP because specifying such a relationship is superfluous. The GIOP plug-in does not attempt to recognize enclosed scopes nor is expected to in any case, mainly because any number of plug-ins and GIOP based message interceptor implementations may be developed and deployed in an existing environment.

The IIOP plug-in, for example, defines it's own IIOP scope within which IIOP specific configuration settings are defined.

(1) GIOP Configuration Settings

BufferLifespan (default PerMessage)

This setting determines the GIOP interceptor and GIOP streams default use of allocated buffer space. The PerMessage setting has no effect on GIOP 1.0 bindings while with GIOP 1.1 and higher, the initial allocated fragment buffer is re-used for subsequent fragments and is not returned to the connection message interceptor implementing buffer allocation until the complete message has been marshalled and transmitted. With PerFragment, each fragment is sent and the associated buffer freed prior to allocating a new buffer for the next fragment. This occurs with each fragment in turn and is used by some transports which rely on the sending of a message fragment to include the freeing of buffer space. An example is a shared memory transport which may reuse the memory segment containing a Request fragment by the receiving process for the subsequent reply to reduce in-use memory resources.

(2) IIOP Configuration Settings

DefaultBufferSize (long, default 4 k)

This value defines the default buffer size allocated by the IIOP message interceptor and returned via the alloc_buffer( ) call. The greater of this default and the specified minimum buffer size requested is used to determined the returned buffer size.

MaxBufferSize (long, default 64 k)

This value sets a soft limit on the maximum buffer size the IIOP message interceptor will allocate and return from the alloc_buffer( ) and realloc_buffer( ) calls. If the requested buffer size exceeds this limit, a CORBA::NO_MEMORY( ) exception is thrown.

UseHostName (boolean, default false)

By default the IIOP plug-in uses I.P. addresses to specify host addresses in published IOR TAG_INTERNET_TOP profiles. In some cases it may be a requirement to specify the host name string instead, for example when used with the Names service running on a multi-homed machine. This setting forces the use of host name strings in profiles.

BufferedSend(boolean, default false)

This determines whether data is buffered by the TCP/IP protocol during transmission. By specifying a false setting, the TCP_NODELAY socket option will be set to disable data buffering by the transport.

DefaultProfileVersion (long, default 1.2)

This settings applies to the profiles published by an ART server and determines the maximum version profiles published by a server. Since ART servers do not publish 1.0 profiles, the possible values for this setting are 1.1 or 1.2.

DefaultClientVersion (long, default 1.1)

This defines the maximum IIOP/GIOP version with which the client is prepared to talk to a server, up to the published profile version, for a specific binding.

TCPSendBufferSize (long, default is chosen by the TCP transport)

This setting allows a specific TCP send buffer size to be specified for new connections. If not given, the default TCP transport setting is used.

TCPRecvBufferSize (long, default is chosen by the TCP transport)

Similarly, this allows the TCP receive buffer size to be specified.

A factor in providing the flexibility of interceptor based pluggable transports is ensuring that performance is comparable to specialized, lower level implementations. The GIOP plug-in design of the present invention attempts to address the typical overheads of data copying, heap allocation, marshalling and demultiplexing as well as specific optimizations based on several principles previously described for implementing efficient protocols.

Several specific optimizations are achieved through the message interceptor mechanisms. Buffer management is left to the connection interceptors implementing the network protocol mapping and which optimize buffer management to take advantage of knowledge of the underlying transport. Configuration settings are flexible enough to also allow the application developer to specialize the transport plug-ins for specific application environments. Buffer space is re-used where possible, particularly when using GIOP fragmentation, and data is passed between interceptors to avoid unnecessary data copying and heap allocations. The CDR implementation from which the GIOP streams interfaces are derived, provide specialized modular methods for specific data types and arrays of basic types (described as improving processor cache affinity). A similar approach is taken by maintaining spatial locality(described as 'outlining' or moving rarely executed error handling code to the end of functions) within the interceptor implementations themselves. Finally, optimized demultiplexing and queuing schemes for incoming message data minimize the overhead of message dispatching and help maximize shared connection efficiency and scale to large numbers of connections. Dynamic tuning of the plugins, particularly the connection interceptor plug-ins can also be provided.

V. Interoperable Object Reference (IORs)

This section describes the ART framework for representing Interoperable Object References (IORs), as described in COBRA 2.1, section 10.6, "An Information Model for Object References". To summarize, an IOR is made up of a string identifying the most-derived interface of the object at the time the reference was created, and a sequence of profiles, each providing an independent set of information used by clients to communicate with the target object. Certain profiles are further decomposed into sequences of components. Profiles and components are identified by tags, and carry data encoded as sequences of octets. OMG specifications define the syntax and semantics of profile and component data identified by certain standardized tags, and the OMG provides a mechanism for allocating unique tags to third parties who need to define their own profiles and components.

COBRA-compliant object request brokers are required to understand and generate object references encoded as IORs in at least two contexts: in IIOP messages and in the strings obtained from COBRA::ORB::object_to_string( ) and passed to COBRA::ORB::string_to_object( ). Since the IOR information model is not only necessary for interoperability over IIOP, but also is highly extensible and is being used to support various new ORB services, it is preferably used as the native object reference information model for ART.

The ART IOR framework represents all IORs that are materialized as object references within an ART process. Object references are introduced into a process when COBRA::ORB::string_to_object( ) is called with a valid stringified IOR, when an object reference, received as a parameter, result, or attribute, is demarshaled, or when an object adapter operation that creates an object reference is invoked.

Object references introduced into a process may originate from ART or from any other COBRA-compliant ORB. The IOR framework efficiently represents the information contained in these IORs, without loss of data, even if they contain unrecognized profiles or components. For those profiles and components that are recognized by code in the receiving process, efficient access is provided for transport and ORB service implementations.

The ART plug-in architecture allows functionality, such as transports and other ORB services, to be configured into applications at link time and at run time. The ART IOR framework allows plug-ins to provide the code that represents and interprets the IOR profiles and components that they use, and provides a scheme to allow multiple transports to share a single profile without knowing anything about each other. It also provides mechanisms for object adapter plug-ins to create new IORs, and for plug-ins providing location daemon functionality to manipulate IORs in order to return location forward responses.

Finally, ART is intended to scale to applications that process millions of objects. The IOR framework extensively applies the Flyweight design pattern in order to optimize its memory usage. It ensures that memory is not wasted with multiple copies of the same object reference. It also strives to avoid storing multiple copies of information that is common to many object references. Although not addressed at this time, these same techniques can also eventually be applied to optimization of the marshaling and persistent storage of IORs.

It should be noted that IOR proxy objects, which allow IORs to serve as language-mapped object references, are contemplated within the present invention. Further, the binding process in which a client ORB uses information in an IOR to establish a communication channel with the target object is also contemplated within the present invention.

The IOR framework design for ART assumes that the COBRA 2.1 IOR structure, and the use of component_based profiles such as the TAG_MULTIPLE_COMPONENTS profile and 1.1 version of the TAG_INTERNET_IOP profile will remain the standard on-the-wire and stringified object reference representations. It also assumes that the OMG will not attempt to standardize programmatic access to IORs in ways that will be incompatible with the optimization techniques it uses.

The ARTs IOR representation provides the following features:

1) Represent all valid IORS, including known and unknown profiles and components, without unintended loss of information.
2) Provide the binding process with efficient access to the information in an IOR.
3) Efficiently support large numbers of fine-grained objects by leveraging the fact that such IOR profiles often differ only by (a portion of) their object keys.
4) Optimize the performance of marshaling and demarshaling (and therefore conversion to and from strings) of IORs.
5) Support the runtime dynamic loading of plug-ins when IOR profiles and components previously unknown to the process are encountered.
6) Provide a mechanism for object adapters to use to efficiently construct IORs supporting multiple protocols and/or ORB services.
7) Allow clients to recognize when multiple objects can share a binding.
8) Use IDL interfaces for all interactions between plug-ins.
9) Support the POA as well as other potential object adapter plug-ins.

Several possible approaches to representing IORs are contemplated within the present invention:

1) Keep the entire IOR in marshaled form (i.e. a CDR encapsulation).
2) Demarshal the IOR into the C++ mapping of the standard OMG IOR IDL definition (a struct containing a sequence of TaggedProfile structs). This leaves each profile body represented as a sequence<octet>.
3) Similar to 2) above, but also demarshal known profile bodies into the C++ mappings of their IDL definitions. The profile representation would store the profile body as an Any, so it wouldn't conform exactly to the OMG standard IOR definition, and custom marshaling/demarshaling code would be needed to convert profile bodies between Anys in memory and sequences of octets on the wire. Unknown profile bodies would be represented in the Anys as sequences of octets.
4) Similar to 3), but treat components in the same way as profiles.
5) Similar to 4), but represent profiles and components as concrete instantiations of abstract Profile and Component interfaces.

Approaches 4) and 5) are capable of meeting feature 2) discussed above. Approaches 1) through 3) keep essential profile and/or component information in marshaled form, so accessing them during binding is less efficient.

Feature 3) also can only be met by approaches 4) and 5). If profiles containing components aren't demarshaled, there is no opportunity to share the representations of those component values that are common to lots of different objects.

Approaches 4) and 5) differ in how they support polymorphic representations of profiles and components. Approach 4) puts a structural representation in an Any, while approach 5) uses IDL interfaces to achieve polymorphism. Approach 5) has the advantage of providing polymorphic operations in addition to polymorphic representations, and can additionally support hierarchies of Profile and Component interfaces. For example, the ART IOR design, which is based on approach 5), uses a StandardProfile abstract interface, derived from Profile, as a base for various profiles that have both object keys and components.

1. ART IOR Overview

This section introduces the various locality-constrained interfaces that make up the ART IOR framework design and describes how they work together. The next section will describe the interfaces and their attributes and operations in detail.

(1) Profiles and Components

IOR profiles are represented as instantiations of interfaces derived from ART_IOR::Profile, and IOR components are represented as instantiations of implementations of interfaces derived from ART_IOR::Component. Any instantiation of any of these interfaces is preferably able to perform the following operations:

return the tag identifying the profile or component return a sequence<octet> representing the profile or component body marshal itself onto a CORBA::IT_OutStream If IDL had parameterized types like C++, ART_IOR::Profile and ART IOR::Component might be declared as instantiations of a template. Alternatively, a base interface could be used to declare these common operations. Most of the same patterns that are applied to profiles and components here could also apply to the service contexts that are used by ORB services to piggyback information on request and response messages.

(2) IORs and the IORManager

Instances of a core-provided implementation of the ART_IOR::IOR interface represent individual IORs. The IOR interface provides read-only access to the IOR's type_Id and to the set of ART_IOR::Profiles it contains. It can marshal itself onto a CORBA::IT_OutStream, by marshaling its type_id followed by each of its profiles. The IOR also maintains a pointer to its current IOR proxy, and can indicate the CORBA::ORB to which it belongs.

Since OMG DL doesn't provide constructors or static operations that could allow the IOR interface to create instances of itself, a separate interface, ART_IOR::IORManager, serves to construct them, either from a type_id and list of Profiles, or from a CORBA::IT_InStream when demarshaling an object reference. A single distinct core-provided implementation of the IORManager interface is associated with each CORBA::ORB instance. Discussion of the various ways IORs are constructed by the IORManager follows.

(3) Profile and Component Factories

All Profile and Component implementations are preferably capable of marshaling themselves, but a mechanism is needed to instantiate the proper implementations when IOR profiles and components are demarshaled. The "Abstract Factory" and "Factory Method" design patterns are used to provide this mechanism. The factory interfaces, ART_IOR::ProfileFactory and ART_IOR::ComponentFactory, define operations that demarshal the body of a profile or component from a CORBA::IT_InStream passed in as a parameter, and return an instance of an ART_IOR::Profile or ART_IOR::Component, respectively. The implementation, and therefore most-derived interface, of the returned Profile or Component is determined by the implementation of the ProfileFactory or ComponentFactory used to demarshal it.

To demarshal the profile or component body, then, the correct factory is found. The tag, which is demarshaled before the body, is used to select the factory that is then used to demarshal the body. The IORManager maintains maps between profile tag values (ART_IOR::ProfileIds) and ART_IOR:ProfileFactorys and, similarly, between component tag values (ART_IOR::Componentids) and ART_IOR::ComponentFactorys. Profile and component tags are allocated by the OMG from separate namespaces, so separate maps are needed.

When a plug-in that provides Profile or Component implementations, and their corresponding factory implementations, is initialized for a CORBA::ORB instance, it registers the factories using operations provided by that ORB's IORManager, which adds them to the appropriate maps. Operations to unregister ProfileFactory and ComponentFactory implementations are also provided for when a plug-in is unloaded, but, unloading such a plug-in may require that all instances of the corresponding implementations first be destroyed.

A scheme can be provided to delay unloading of the plug-ins's shared library or Dynamic Link Libraries (DLL) from a process until all instances it implements have been destroyed.

If, when demarshaling an IOR, the IORManager is asked to find a ProfileFactory or ComponentFactory for a tag that is not present in its map, the IORManager has the opportunity to attempt to dynamically load a plug-in that provides a factory for that tag. To support this, the configuration facility will need to provide maps between profile and component tags and the plug-ins that provide their factories. A plug-in loaded in response to encountering an unknown profile or component tag may provide more than just the appropriate factory implementation and corresponding profile or component implementation; it may also provide the support for the transport protocol or ORB service that the tag is associated with, achieving design feature 5) discussed above.

If no plug-in is available that provides a factory for a particular tag, then the IORManager uses a factory that returns an instance of ART IOR::DefaultProfile or ART_IOR::DefaultComponent. These implementations, provided by the ORB core, can represent any unknown profile or component as a sequence of octets, so design feature 1) is achieved. Factories for these default implementations can also be explicitly registered for specific tags when sequence<octet> is the appropriate representation. On-demand loading of plug-ins is contemplated within the present invention.

(4) Performance and Scalability Optimization

To partially realize design feature 3), and potentially help with feature 4), the "Flyweight" design pattern is applied to all implementations of the ART_IOR::Profiler, ART_IOR::Component, and ART_IOR::IOR interfaces, as well as others that have not yet been discussed. For each implementation of these interfaces, no more than a single instance with a particular value is ever instantiated in a process at a time. This means that when the same IOR is demarshaled multiple times, a single instance is shared. Furthermore, if references to several objects implemented in the same process or POA are demarshaled in another process, it is likely that only their object_keys differ, and most or all of their Components (but not their Profiles) can be shared, thereby improving support of fine-grained objects.

In order to implement the "Flyweight" pattern, each factory implementation preferably keeps a map of the values it currently has instantiated. When asked to demarshal a profile or component, the factory checks the map to see if an instance with the same value already exists, and returns it if found. If an existing instance is not found, the factory constructs a new instance, which is entered in the map. When the instance is destroyed, it is removed from the map. This requires locking to prevent separate threads from simultaneously creating instances with the same value, and to prevent one thread from returning an instance that another thread is about to destroy. The IORManager similarly maintains a map of instantiated IORS. Note, though, that this design pattern mandates that, at least as far as identity goes, all Profile and Component implementations, as well as the IOR implementation, are immutable once instantiated.

The "Flyweight" pattern is preferably rigorously applied throughout the IOR representation to optimize performance. By requiring all Components to be "Flyweights", the comparison and hashing operations needed to implement Flyweight Profiles become trivial. Two Components can be compared by simply comparing their pointers, and a hash value for a list of Components can be computed as a function of the pointer values. Similarly, requiring all Profiles to be Flyweights makes efficient support for Flyweight IORs possible.

Use of the "Flyweight" pattern potentially also helps optimize overall system performance because it can drastically reduce the number of heap allocations made when demarshaling an IOR. Since the CORBA::IT_InStream from which an IOR is being demarshaled is passed all the way in to the various factories, the case where the item being demarshaled has already been instantiated will usually require no heap allocation at all.

Two class templates provided by the ITL class library, ITL_FWValueBase and ITL_FWTable, along with the ITCxxDOAFlyweightServant class template and the ITCxxDOAFactoryServantBase class, greatly simplify implementation of the IOR-related classes that follow the "Flyweight" pattern in the ART core, and are available to plug-in implementers as well.

(5) Standard Profiles

Although this design supports the representation and use of arbitrary IOR profiles by clients and servers, feature 6) requires that the use of profiles by various transport protocols and ORB services be coordinated when a server generates a new IOR, in order to minimize redundant information. The CORBA specification forbids a client from using information from more than one IOR profile when making any invocation, so redundant information can only be avoided by sharing a profile. Certain assumptions will be made about what information typically can be shared in order to minimize the size of an IOR that supports more than one protocol.

Transport protocols typically require an IOR profile to carry addressing information and an object_key. The addressing information is protocol-specific, and can be encoded in an IOR profile as a component. The object_key, passed from the client to the server to identify the target of the request, can usually be shared among all the supported protocols. The encoding of the object_key within the profile may depend on the specific profile being generated.

Some ORB services also require that a profile a carry a specific component or components that describe to the client the ORB service being offered by the server. This ORB service information is likely to be applied to invocations regardless of which transport protocol is being used. Alternatively, a specification of which ORB-service components apply to which protocols can be provided, or separate profiles can be provided as well.

In addition, features relating to detecting component incompatibilities, and generating more than one profile if necessary can also be provided.

Two standard profile tags are defined in CORBA 2.1. The TAG_MULTIPLE_COMPONENTS profile body is composed entirely of components, one of which may contain an object_key. The TAG_INTERNET_IOP profile's structure depends on its version. Version 1.0 contains the version, host, port, and object_key used by the IIOP protocol, but is not extensible and therefore is not a candidate for sharing with other protocols. Versions 1.X, where X>0, add a list of components, and so are capable of supporting additional protocols and ORB services. The ART IOR framework is able to support multiple protocols and their associated ORB services using a single TAG_MULTIPLE_COMPONENTS profile or a single version 1.1 TAG_INTERNET_IOP profile. When creating a new IOR, the TAG_INTERNET_IOP profile can be used if and only if the target object can be invoked using IIOP; the TAG_MULTIPLE_COMPONENTS profile can be used otherwise. Because not all ART configurations will support IIOP, but some may need to read its profile even if they don't speak the protocol, the TAG_INTERNET_IOP profile implementations are packaged in the iiop_profile plug-in, rather than in the ART core or the iiop plug-in.

In order to de-couple transport protocols and ORB services from specific profiles, and therefore enable profile sharing without a priori agreement on what profile will be used, the ART IOR design includes two abstract interfaces. First, ART_IOR::ObjectKeyProfile, which is derived from ART_IOR::Profile, is inherited by any Profile implementation that has a defined way to encode an object_key. It provides read-only access to the object_key, and an operation for marshaling the object_key onto a CORBA::IT_OutStream. The ART_IOR::StandardProfile interface derives from ObjectKeyProfile, and adds read-only access to a list of Components (and to an endpoint ID, which is described below).

The ART implementation of the version 1.0 TAG_INTERNET_IOP profile exports the ART_IIOP_Profile::Profile_1_0 interface, which inherits ObjectKeyProfile. The implementation of the version 1.1 TAG_INTERNET_IOP profile exports the ART_IIOP_Profile::Profile_1_1 interface, which inherits StandardProfile. The ART_IOR::MCProfile interface exported by the implementation of the TAG_MULTIPLE_COMPONENTS profile also inherits StandardProfile, and its implementation uses the TAG_COMPLETE_OBECT_KEY component to store the object_key, as specified in CORBA 2.1 for DCE-CIOP.

A Profile_1_X implementation, and interface, is needed to preserve any extra fields that may be added after the list of components in a future minor revision of IIOP.

Although a plug-in can add arbitrary new profiles to the ART IOR framework, transport protocols designed for ART can be written to use any arbitrary implementation of StandardProfile in order to maximize their ability to share a profile with IIOP and/or other ART-specific protocols. When attempting to bind, protocol client implementations look for their components in all StandardProfiles present in the IOR. Protocol server implementations use a mechanism to be described below to have their components included in whatever StandardProfile is generated when a new IOR is created.

(6) Endpoint Optimizations

Feature 3) described above requires that the representation of IORs be able to scale to large numbers of fine-grained objects. Using the "Flyweight" pattern as discussed above helps scalability by ensuring that redundant copies of individual Components, Profiles, and IORs are not stored in memory.

The ART IOR framework design takes advantage of the assertion that, for large numbers of objects to exist, relatively large subsets of them have been created in the same place and in the same way. If millions of objects are to be created using the POA, for instance, it is likely that a relatively small number of POA instances will be used to create them. Therefore, many objects will share the same POA name and set of POA policies, and will differ only in the type_ids and object_ids supplied or generated when their references are created. The POA policies help determine what components are included in the objects' IOR profiles, while the POA name and object_id are encoded in each profile's object_key. The type_id is encoded in the IOR outside of any of its profiles. The result is that two objects created in the same POA instance have IOR profiles that differ only in the portion of the object_key that encodes the object_id. Similar arguments may apply to other object adapter specifications as well. The ART IOR design achieves feature 3), scalability to large numbers of fine-grained object, by sharing the representation of this common profile information. The same mechanism also helps achieve feature 6), the optimization of the binding process.

CORBA interoperability treats the object_key found in an IOR profile as opaque to the client. Without additional information, a process other than the server that created the object reference cannot know which portion of the object_key is different for each object and which portion is the same, and therefore cannot share any portion of the object_key. The DCE-CIOP specification defines a component that can supply this information; the TAG_ENDPOINT_ID_LOCATION component specifies the indices within the object_key of the first and last octet of the endpoint identifier. The ART StandardProfile implementations, ART_IOR::MCProfile and ART_IIOP Profile::Profile_1_1, use this component, if present, to identify the portion of the object_key that can be shared. The individual profile representations contain the portions of the object_key that precede and follow the endpoint identifier, plus a pointer to a representation of the shared information, such as the endpoint identifier and the list of components. Note that the TAG_ENDPOINT_ID_LOCATION component itself is treated specially on this list, so that it can be shared even though the indices may be different for each profile.

The ART_IOR::StandardProfile interface provides a read-only attribute to access the endpoint identifier if present. If the profile contains both an object_key and a TAG_ENDPOINT_ID_LOCATION component that specifies what part of the object_key is the endpoint identifier, then the endpoint_id accessor returns this portion of the object_key; otherwise it returns an empty OctetSeq. Objects implemented using the POA in ART will use the set of nested POA names, together with some encompassing domain name and any other needed information, to form the endpoint_id.

The ART architecture takes the presence of an endpoint_id in a profile as an assertion, by the server to the client, that the object belongs to a particular endpoint. An endpoint is defined for ART as a collection of objects that are forever co-located and share common policies, and therefore can share a binding. Transport clients can then use the endpoint_id to help determine when an existing binding can be used for an unbound object.

It should be noted that endpoint_ids can be scoped globally, or only consider two profiles to share an endpoint if all profile information other than the endpoint_id portion of the object_key is identical. In the latter, clients need an API other than just the endpoint_id accessor to recognize that two profiles are at the same endpoint.

(7) IOR Construction

Finally, a mechanism is needed for object adapters to construct new IORS. Constructing an IOR involves three kinds of parties: the ART core's IOR management framework, the object adapter creating the object reference, and the various Profile and Component implementations supplied by the core, transports, and other ORB services.

Object Adapters

As discussed previously, object adapters such as the POA can group individual objects into endpoints to optimize both the IOR representation and the client's binding process. Before creating an individual object reference, then, the object adapter creates the endpoint to which it will belong. But, in the POA specification, individual POA instances, which correspond to endpoints in ART, are not completely independent in a way that is reflected through the ART core to the transports. One or more PortableServer::POA instances are associated with a PortableServer::POAManager instance, which is used by the server application to manipulate the flow-control state of all the POAs with which it is associated. This grouping of endpoints for flow-control purposes might effect the Components that transports put in IORs. For example, a socket might be shared among those endpoints that share flow-control state, and the socket's port might be advertised in the IOR profiles. Therefore, the ART core provides an abstraction, the ART_IOR::EndpointManager interface that corresponds to the POA's POAManager interface and that is used for creating endpoints and manipulating their flow-control state.

Before creating endpoints, an object adapter first creates a core_implemented object exporting the EndpointManager interface by invoking the create_endpoint_manager( ) operation on the IORManager. The POA implementation may perform this each time it creates a new POAManager, and will store the returned EndpointManager reference with the POAManager for use when creating POA instances. Other object adapters might create an EndpointManager for each endpoint, or use a single EndpointManager for all endpoints.

Now, when the object adapter needs to create a new endpoint, it invokes the create_endpoint( ) operation on the appropriate EndpointManager instance, passing in the endpoint_id and a list of CORBA::Policy objects, and is returned a new core-implemented ART_IOR::Endpoint instance. The POA stores the returned Endpoint instance in its corresponding POA instance.

Finally, to create a new object reference, the object adapter invokes get_ior( ) on the appropriate ART_IOR::Endpoint, passing in the object_id and type_id. It is returned an IOR, to which it can then attach an appropriate chain of proxies, and return to the application. The ART core takes care of coordinating with the transports and other ORB services to assemble the proper Profiles and Components based on the Policy objects that were passed EndpointManager::create_endpoint( ). The object_key is composed by concatenating the octets of the endpoint_id passed to EndpointManager::create_endpoint( ) with the octets of the object_id passed to Endpoint::get ior( ). The content and format of the endpoint_id and object_id is under the control of the object adapter, but an ART-specific tokenizing syntax is required, at least for the initial octets of the endpoint_id, in order to support server-side dispatching based on the object_key.

Transports and ORB Services

To become involved in the construction of IORs, transports and other ORB services first make themselves known to the ART core. As discussed above, a transport or ORB service that implements Profiles or Components registers its ProfileFactory and/or ComponentFactory instances with the IORManager to become involved in the demarshaling of IORs. Similarly, to become involved in the creation of new IORs by object adapters, a transport or ORB service implements an instance of the ART_IOR::Service interface, and registers this instance with the IORManager. Operations are invoked on these registered instances during the process of constructing an IOR, which takes place in several phases under the control of an object adapter.

When an object adapter creates an EndpointManager, the IORManager informs all of the registered Services by invoking the new_endpoint_manager( ) operation on each. An ART IOR::Service that needs to be involved in the creation of Endpoints and IORs under that EndpointManager, and/or that needs to be informed of changes to that EndpointManager's flow-control state, creates an instance of its own implementation of the ART_IOR::ServiceEndpointManager interface and adds it to an inout list passed to new_endpoint_manager( ). The EndpointManager then informs the ServiceEndpointManagers on this list of relevant events by invoking operations on them.

When the object adapter invokes EndpointManager::create_endpoint( ) to create a new Endpoint, the EndpointManager interacts with its list of ServiceEndpointManagers to assemble the Components and sharable Profile information that will be used when creating IORs for that Endpoint. It does this in two phases. First it creates an empty list of Components, adds any core_upplied Components, and passes the list as an inout parameter to the add components( ) operation of each ServiceEndpointManager. This allows the transports and ORB services to supply the Components that they wish to have included in StandardProfiles for that Endpoint. Then the EndpointManager creates an empty list of ART_IOR::ProfilerEndpoints and passes this list along with the endpoint_id and the complete list of Profiles to the add_profile_endpoints( ) operation of each ServiceEndpointManager. If a transport or ORB service, such as IIOP, requires a specific Profile to be included in the IORs generated for that Endpoint, it creates an instance of its own implementation of the ART_IOR::ProfileEndpoint interface, containing any endpoint_specific information that it needs to generate actual Profiles, and adds it to the list. After all the ServiceEndpointManagers have has their chance to add ProfileEndpoints, the EndpointManager scans the list for any whose standard attribute is TRUE. If there are none claiming to be the ProfileEndpoint of a StandardProfile, then the ART core creates a ProfileEndpoint for its implementation of the TAG_MULTIPLE_COMPONENTS profile, and adds it to the list. The complete list of ProfileEndpoints is then stored in the created Endpoint instance that is returned to the object adapter.

Several distinct Component lists and ProfileEndpoint lists can be created when different transports or ORB services are not able to share a single Profile.

At last, the object adapter is ready to create an object reference, so it invokes Endpoint::get_ior( ). The Endpoint creates an empty list of Profiles, and then iterates over its list of ProfileEndpoints. It invokes get_profile( ) on each ProfileEndpoint, passing in the object_id and adding the returned Profile to its list of Profiles. The Endpoint then uses the type_id and list of Profiles to create the IOR, and returns it to the object adapter.

```
    2.  Interface Definitions
        (1)    ART_IOR::Component
               module ART_IOR
{
    interface Component
    {
        readonly attribute IOP : : ComponentId tag;
        readonly attribute CORBA : : IT_OctetSeq octets;
        void
        marshal_octets(
            in CORBA : : IT_OutStream stream
        );
    };
    typedef sequence <Component> ComponentSeq;
};
        (2)    ART_IOR::ComponentFactory
               module ART_IOR
{
    interface ComponentFactory
    {
        Component
        demarshal_component
            in IOP : : ComponentId tag,
            in CORBA : : IT_InStream stream
        ) ;
        Component
        get_component(
            in IOP : : Componentid tag,
            in CORBA : : IT_OctetSeq data
        ) ;
    };
};
        (3)    ART_IOR::DefaultComponent
               module ART_IOR
{
    interface DefaultComponent
        : Component
    {
    } ;
} ;
```

```
        (4)    ART_IOR::Profile
               module ART_IOR
{
    interface Profile
    {
        readonly attribute IOP : : Profileid tag;
        readonly attribute CORBA : : IT_OctetSeq octets;
        void
        marshal octets(
            in CORBA : : IT_OutStream stream
        } ;
    } ;
    typedef sequence <Profile> ProfileSeq;
} ;
        (5)    ART_IOR::ProfileFactory
               module ART_IOR
{
    interface ProfileFactory
    {
        Profile
        demarshal_profile
            in IOP::ProfileId tag,
            in CORBA::IT_InStream stream
        } ;
        Profile
        get_profile (
            in IOP::ProfileId tag,
            in CORBA::IT_OctetSeq data
        ) ;
    } ;
} ;
        (6)    ART_IOR::DefaultProfile
               module ART IOR
{
    interface DefaultProfile
        : Profile
    {
    };
} ;
        (7)    ART_IOR::ProfileEndpoint
               module ART_IOR
{
    interface ProfileEndpoint
    {
        readonly attribute boolean standard;
        Profile
        get profile (
            in CORBA::IT_OctetSeq objectid
        ) ;
    } ;
    typedef sequence <ProfileEndpoint> ProfileEndpointSeq;
} ;
        (8)    ART_IOR::ObjectKeyProfile
               module ART_IOR
{
    interface ObjectKeyProfile
        : Profile
    {
        readonly attribute CORBA::IT_OctetSeq object_key;
        void
        marshal_object key (
            in CORBA : : IT_OutStream stream
        ) ;
    } ;
} ;
        (9)    ART_IOR::StandardProfile
               module ART_IOR
{
    interface StandardProfile
        : ObjectKeyProfile
    {
        readonly attribute CORBA::IT_OctetSeq endpoint_id;
        readonly attribute ComponentSeq components;
    } ;
} ;
        (10)   ART_IOR::MCProfile
               module ART_IOR
{
    interface MCProfile
        : StandardProfile
```

-continued

```
        {
    };
};
        (11)    ART_IOR:MCProfileFactory
    module ART_IOR
{
    interface MCProfileFactory
        : ProfileFactory
        {
        ART_IOR : : ProfileEndpoint
        get_endpoint (
            in CORBA::IT_OctetSeq endpoint id,
            in ComponentSeq components
        );
    };
};
        (12)    ART_IOR::IOR
    module ART_IOR
{
    interface IOR
        {
        readonly attribute CORBA : : RepositoryId type_id;
        readonly attribute ProfileSeq profiles;
        readonly attribute CORBA : : ORB orb;
        void
        marshal (
            in CORBA::IT_OutStream stream
        );
        readonly attribute Object proxy;
        //   If the IOR's current default proxy is old_proxy, set its
        //   current default proxy to new_proxy. But if the IOR's
        //   current default proxy is not old_proxy, release new_proxy
        //   duplicate the existing propert, and return it as the output
        //   value of new_proxy.
        void
        replace_proxy(
            in Object old_proxy,
            inout Object new_proxy
        );
        //   If the IOR's current default proxy is old_proxy, set its
        //   current default proxy to nil.
        void
        remove_proxy(
            in Object old_proxy
        );
    };
};
        (13)    ART_IOR::ServiceEndpointManager
    module ART_IOR
{
    enum EndpointState
        {
        holding,
        active,
        discarding,
        inactive
    };
    interface ServiceEndpointManager
        {
        //   IOR construction
        void
        add_components (
            in CORBA::TT_OctetSeq endpoint_id,
            in CORBA::PolicyList policies,
            inout ComponentSeq endpoint_components
        );
        void
        add_profile_endpoints (
            in CORBA::IT OctetSeq endpoint_id,
            in CORBA::PolicyList policies,
            in ComponentSeq endpoint_components,
            inout ProfileEndpointSeq profile_endpoints
        );
        //   state management
```

```
        void
        change_state (
            in EndpointState new state
        );
        void
        pend_completion ( );
    };
    typedef sequence<ServiceEndpointManager>
ServiceEndpointManagerSeq;
};
        (14)    ART_IOR::Service
    module ART_IOR
{
    interface Service
        {
        void
        new_endpoint_manager (
            in CORBA : : PolicyList policies,
            inout ServiceEndpointManagerSeq
service_endpoint_managers
        );
    };
};
        (15)    Art_IOR::Endpoint
    module ART_IOR
{
    interface Endpoint
        {
        readonly attribute CORBA::IT_OctetSeq endpoint_id;
        IOR
        get_ior(
            in CORBA : : IT_OctetSeq object_id,
            in CORBA : : RepositoryId type_id
        );
    };
};
        (16)    ART_IOR::EndpointManager
    module ART IOR
{
    interface EndpointManager
        {
        Endpoint
        create_endpoint(
            in CORBA::IT_OctetSeq endpoint_id,
            in CORBA::PolicyList policies
        );
        EndpointState
        get_state ( );
        void
        change state (
            in EndpointState new_state
        );
        void
        pend_completion ( );
    };
};
        (17)    ART_IOR::IORManager
    module ART_IOR
{
    interface IORManager
        {
        // ProfileFactory map
        readonly attribute ProfileFactory
default_profile_factory;
        void
        register profile factory (
            in IOP::ProfileId tag,
            in ProfileFactory factory
        );
        void
        register_default_profile_factory (
            in IOP : : ProfileId tag
        );
        void
        unregister_profile_factory (
            in IOP : : ProfileId tag
        ProfileFactory
        find_profile_factory (
            in IOP : : ProfileId tag
```

-continued

```
        );
        // ComponentFactory map
        readonly attribute ComponentFactory
default_component_factory;
        void
        register_component_factory (
            in IOP : : Componentid tag,
            in ComponentFactory factory
        );
        void
        register default_component_factory (
            in IOP : : ComponentId tag
        );
        void
        unregister_component_factory (
            in IOP : : ComponentId tag
        );
        ComponentFactory
        find_component_factory (
            in TOP : : ComponentId tag
        );
        Component
        get_component_surrogate (
            in IOP : : ComponentId tag
        );
        // Service registry
        void
        register_service (
            in Service svc
        );
        void
        unregister service
            in Service svc
        );
        // IOR construction
        IOR
        get_ior (
            in CORBA : : RepositoryId type_id,
            in ProfileSeq profiles
        );
        EndpointManager
        create_endpoint manager (
            in CORBA : : PolicyList policies
        );
        // marshaling and demarshaling
        void
        marshal_nil (
            in CORBA::IT_OutStream stream
        );
        IOR
        demarshal ior (
            in CORBA::IT_InStream stream
        );
        Profile
        demarshal_profile (
            in IOP : : ProfileId tag,
            in CORBA : : IT_InStream stream
        );
        Component
        demarshal_component (
            in IOP : : ComponentId tag,
            in CORBA : : IT InStream stream
        );
        void
        shutdown ( );
    };
};
        (18)  ART_IIOP_Profile::Profile_1_0
            module ART_IIOP_Profile
{
    interface Profile_1_0
        : ART_IOR::ObjectKeyProfile
    {
        readonly attribute octet version_major;
        readonly attribute octet version_minor;
        readonly attribute string host;
        readonly attribute unsigned short port;
    };
};
        (19)  ART_IIOP_Profile::Profile_1_1
            module ART- IIOP Profile
{
    interface Profile_1_1
        : Profile_1_0, ART IOR : : StandardProfile
    {
    };
};
        (20)  ART_IIOP_Profile::ProfileFactory2
            module ART_IIOP_Profile
{
    interface ProfileFactory2 // MSVC++ 5.0 bug – can't use same name as base
        : ART TOR : : ProfileFactory
    {
        ART_IOR : : ProfileEndpoint
        get_endpoint (
            in CORBA::IT_OctetSeq endpoint_id,
            in string host, in unsigned short port,
            in ART_IOR::ComponentSeq components
        );
    };
};
```

Simply merging together each transport's components into a single profile may not always be sufficient. One transport may need a value for a component that conflicts with the value needed for the same component by another transport. Or one of the transports might explicitly not want that component to appear to apply to it.

VI. Object Key

This section describes the ART framework for representing object_keys. The document is split into two; the first part describes the architecture of an object_key of the present invention, and the second part describes the POA specific representation of an object_key. Orbos/97-09-01 section 12.7.2 "HOP IOR Profiles" states that 'object_key is an opaque value supplied by the agent producing the IOR. This value will be used in request messages to identify the object to which the request is directed. An agent that generates an object_key value must be able to map the value unambiguously onto the corresponding object when routing requests internally.'

On the server side, the object_key is architecturally a series of segments. On the client side, the object_key is a series of octets.

As noted above, this section describes the elements contained in the object_key—the endpoint_id and object_id. A short overview of the object_key's position in the IOR.

Since the object_key is an opaque value outside the POA, its internal design should have no major impact on anything outside the POA.

The ART object_key representation provides the following to enable the ART core to perform best-match dispatching based on the object_key and performance.

Figure 3:
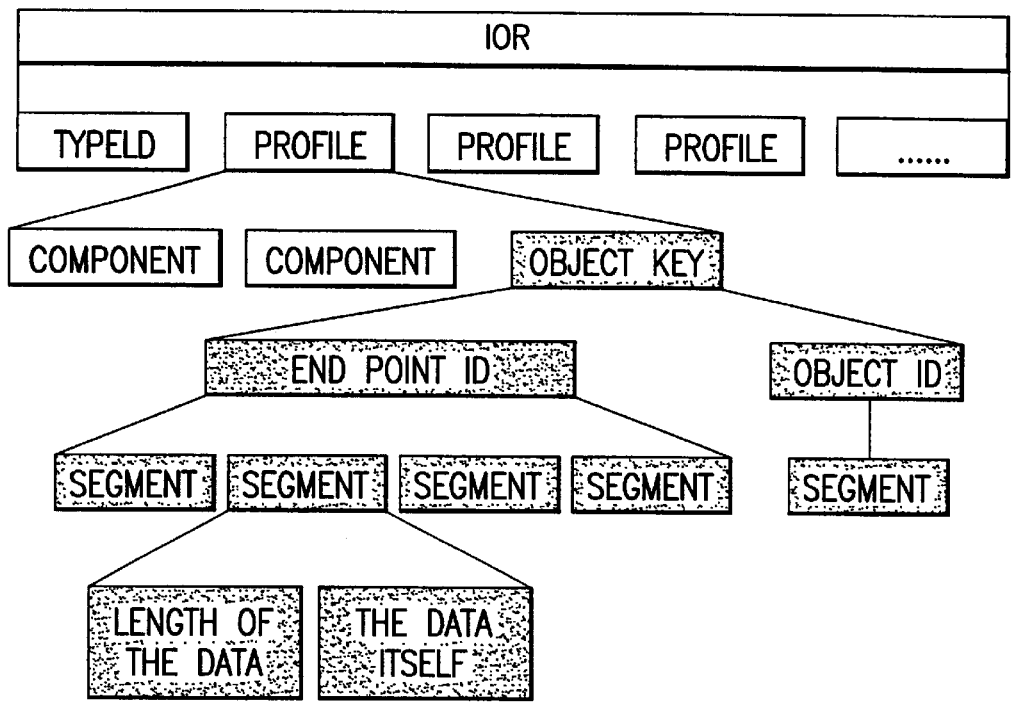
FIG. 3 is a system architecture diagram illustrating the position of object_key within the IOR.

Referring to FIG. 3, the object_key is a component within a profile in an IOR that identifies the target object of a request. An object_key consists of an arbitrary number of segments, which can be grouped into endpoint_id segments and an object_id segment.

The DCE-CIOP specification defines a component with the tag.

TAG_ENDPOINT_ID_COMPONENT that tells the client which portion of the object_key is different for each object created inside the scope of the same endpoint_id. The client can then use this information to avoid storing redundant portions of object_keys. From the client side, the endpoint_id location may be anywhere within the object_key and it is optionally present.

1. Format of a Segment

A segment is implemented as a sequence of octets with two logical fields. The first field contains the length of the second field, which contains the data of the segment. For example, if the data to be contained in the segment is the string "my_obj2/0" (seven octets long, followed by a null termination character), the octet representation of the segment would be:

[08 6d 79 5f 6f 62 6a 32 00].

For large segments more than one octet can be used to indicate the length. If the high order bit of an octet in the length section is set, then the following low order 7 bits is concatenated to this octet's low order 7 bits to calculate the length of the data field. For example, if the data field of a segment is 300 octets long, the length field is encoded as follows:

The binary for 300 is 00000001 00101100, which is too long to fit into a single octet. Therefore, the high order bit of the first octet is set and split the bits into two octets:

0b10000010 0b00101100 (=0b0000010 0b0101100=300)
followed by 300 octets for the data.

With this encoding method, data lengths of up to 127 with one octet and up to 16383 with two octets can be represented. It's unlikely that any ART object_key would require a segment of more than 16 k octets, but if it does, the encoding scheme can scale to allow it by simply adding in more octets to the length field. There's no limit to the number of octets the length field of a segment can represent.

Figure 4:
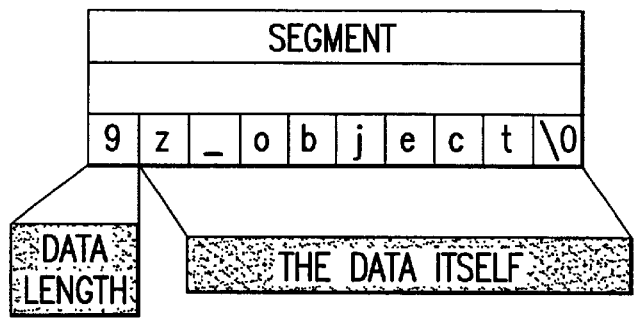
FIG. 4 is a diagram illustrating a segment that includes a section having the data length and another section having the data.

A distinction can be made between the data length of a segment and the encoded length of a segment. The former is the first field in the segment and contains the length of the other "data" field in the segment. The latter refers to the length in octets of the entire segment, including the data length field. FIG. 4 shows the distinction between the two.

Note that the format of a segment is consistent—the format of a segment for an object_id is exactly the same as the format of the segments in an endpoint_id.

2. The endpoint_id

An endpoint_id should not be confused with an Endpoint. The endpoint consists of an endpoint_id and other information that is not relevant to the object_key.

Each endpoint_id contains an Endpoint Format Id segment to indicate the format of its components. The Endpoint Format Id will always be the first segment in the endpoint_id. Plug-in developers who create their own Object Adapters will need to request to receive a specific Endpoint Format_Id, similar to the way vendors request the OMG to assign tag values to vendor proprietary extensions.

The present invention supports two Endpoint Format Ids—one for Transient endpoint_ids and one for Persistent endpoint_ids. In order to minimize the amount of space taken up by the Endpoint Format Id in the object_key, ART uses just two octets to signify its Endpoint Format Ids. The first octet refers to whether the object_key is transient or persistent, represented by the octet "1" or "2" respectively, and the second octet is a version number.

For example, the Endpoint Format Id segment for an. ART persistent object would be [02 31 31]. This represents a segment with a data length of two octets. The first octet signifies that the Endpoint is for persistent objects, and the second octet signifies that version one of this Endpoint Format Id is being interpreted. Note that the ASCII codes for '1' and '2' are 31 and 32 respectively, so the persistent object above represents version 1 of the POA Transient Endpoint Format Id.

The following sections describe how an endpoint_id is built up in the POA for Transient and Persistent objects.

3. Transient Endpoint Id.

The format of endpoint_ids for Transient POAs provides avoiding accidental re-use of old (and no-longer valid) object references and efficiency.

As shown in TABLE 1, a Transient endpoint_id consists of:

The POA Transient Endpoint Format Id—'31''31'

A Unique System-Dependent Identifier (USD 1)

The Unique System-Dependent Identifier is a segment consisting of a twelve octets. The first four octets contain a random number, the second four octets contain a timestamp, and the final four octets contain a system-dependent process id. The random number and timestamp ensure that transient object_keys are unique within the same process and cannot be accidentally re-assigned.

TABLE 1

| Endpoint Format Id length | Format Id | USDI Length | USDI |
|---|---|---|---|
| 02 | 3131 | 12 | (ASCII) 56A4100D56FS |

The FQPN can also be provided in the TRANSIENT endpoint ID. This feature would allow logging/debugging/system monitoring tools to output a human readable name indicating where an incoming request is destined.

(1) Indirect Persistent Endpoint Id

The endpoint_id for indirect (daemon-controlled) persistent CORBA::Objects includes the following:

The Persistent Endpoint Format Id—'32''31'

The Location Domain Identifier.

The Fully Qualified POA Name.

The format and an example of a Persistent endpoint_id for a sub-POA named "subpoa 1" are shown in TABLE 2. Note that since the RootPOA has the TRANSIENT Lifespan policy, a Transient endpoint id will always be created in a sub-POA, and so will always have a FQPN segment.

TABLE 2

| Endpoint Format Id length | Format Id | Location Domain length | Location Domain | FQPN Length | FQPN |
|---|---|---|---|---|---|
| 02 | 32 31 | 06 | (ASCII) BOEING | 08 | (ASCII) subpoa1/0 |

(2) Direct Persistent Endpoint Id

The endpoint_id for direct persistent CORBA::Objects consists of the following:

The Direct Persistent Endpoint Format Id—'33''31'

The Fully Qualified POA Name.

The format and an example of a Direct Persistent endpoint_id for a sub-POA named "direct_poa 1" are shown in TABLE 3. Note that since the RootPOA has the TRANSIENT Lifespan policy, a Persistent endpoint_id will always be created in a sub-POA, and so will always have a FQPN segment.

TABLE 3

| Endpoint Format Id length | Format Id | FQPN Length | FQPN |
|---|---|---|---|
| 02 | 33 31 | 12 | (ASCII) direct_poa_1\0 |

4. Format of the Fully Qualified POA Name (FQPN)

The endpoint_id for PERSISTENT POAs contains the Fully Qualified POA Name. The ORB uses this field to determine which POAs exist in order to service a request, allowing it to activate any needed POAS. The FQPN is stored as a series of null-terminated strings within a single segment. All requests for non-existent PERSISTENT POAs are routed back to the daemon. This allows the FQPN to be placed in a single segment, thus improving method dispatch. For example, the FQPN for ChildC in the following hierarchy:

RootPOA
   ChildA
      ChildB
         ChildC would be represented as follows:

ChildA\0ChildB\0ChildC\0

Note that the RootPOA is implicit in the FQPN, since it forms the base of every POA hierarchy.

5. The object_id

An object_id is a user- or system-specified identifier used to "name" an object within the scope of its endpoint_id. The only constraint is that each is unique within the endpoint_id where it is created or registered. The object_id is the last segment in the object_key.

(1) The format of a user-generated object_id

Users can create and assign their own object_ids for an object. The object_id type is defined as an unbounded sequence of octet, and the user can create and initialize their own object_id octet sequence. However, it's usually easiest just to use a string for the object identifier and convert it to an object_id. The OMG ctt mapping for the POA contains the following special conversion functions for this purpose:

char* ObjectId to_string(const ObjectId&);
   WChar* ObjectId_to_wstring(const ObjectId&);
   ObjectId* string_to_ObjectId(const char*);
   ObjectId* wstring_to_ObjectId(const WChar*);

The POA specification does not dictate what character sequence the sequence of octets should map to; it just states that "the C++ mapping provides several conversion functions that convert strings to ObjectId and vice-versa". The ART POA translates a null-terminated string into an object_id and back again by simply copying the individual char* values in the string directly into the octet sequence. Note that the NULL termination character is also a part of the octet sequence. For example, an object_id can be created with the following code:

PortableServer::ObjectId_var oid=string_to_ObjectId
      ("my_object");

which will create an object_id segment with an encoded length of eleven octets—one octet for the length field, nine octets for the text and one the NULL termination character. The server code can then explicitly register a servant with a POA with this object_id.

(2) ORB Generated Object Ids (a) Transient Objects

Object Ids generated by Transient POAs consist of four octets, containing a monotonically increasing CORBA::ULong. The first Object Id will be assigned 0, the next 1, and so on. Although this format is open to the possibility of duplicate ids, the large size of CORBA::ULong makes this extremely unlikely; effectively, the server would need to create 4 billion objects before id duplication became possible.

(b) Indirect Persistent Objects

If an object_id for a CORBA::Object is to be generated by the POA with the PERSISTENT Lifespan policy, for example when create_reference( ) is called on the POA, it provides an object_id segment with an encoded length of nine octets. This object_id is a series of octets in network byte order, containing a struct that consists of two CORBA::ULongs. The first ULong is called the "POA Activation Sequence Number". If the POA uses indirect persistence, this number is obtained from the Daemon; sequence number is initialized to I and is incremented by the Daemon each time the POA activates. If the POA uses direct persistence, the activation number is randomly generated. The second Ulong is local to the POA and is of the same format as described in the section on transient objects above—it contains a CORBA::Ulong in network byte order.

The POA Activation Sequence Number is needed as the CORBA::ULong local to the POA will be initialized to one at the start of every process, so if the Persistent POA is in a process that is restarted, subsequent ORB-generated object_ids will not clash with object_ids generated by the previous process.

An example object_id segment for a Persistent object would be the octet sequence:

[08 00 00 00 01 00 00 00 0A]

6. Format of a Complete object_key (1) Transient object_key

The complete object_key is generated by concatenating the Endpoint Id and object_id segments. As described above, the entire object_key is also preceded by a field that gives the number of segments that the object_key contains.

The object_key for a Transient CORBA::Object in a sub-POA with a user-provided object id is shown below. The length fields are in bold and unprintable characters are represented by a '*'.

[02 31 31 12 56 A4 10 0D 56 F5 10 6d 79 5f 6f 62 6a 65 63 74 00]"*11*********my_object"

TABLE 4

| endpoint_id | | |
|---|---|---|
| Endpoint Format Id | Endpoint Id | object_id |
| 31 31 | A3 E8 80 01 00 00 00 09 | my_object\0 |

(2) Indirect Persistent object_key

[02 32 31 09 61 72 74 2D-69 6E 76 6F 6 2 0A 72 65 74 61 69 6E 5F 70 6F 61-15 6D 79 5F 70 65 72 73 69 73 74 65 6E 74 5F 6F -62 6A 65 63 74]

"*21*art-invob*retain_poa*my_persistent object"

TABLE 5

| endpoint_id | | |
|---|---|---|
| Endpoint Format Id | Persistent POA FQPN | object_id |
| 33 31 | (ASCII) retain_poa | ASCII) my_persistent_object\0 |

(3) Direct Persistent object_key

[02 32 31 0A 72 65 74 61 69 6E 5F 70 6F 61-15 6D 79 5F 70 65 72 73 69 73 74 65 6E 74 5F 6F -62 6A 65 63 74]

"*31*retain_poa*my_persistent_object"

TABLE 6

| endpoint_id | | |
| --- | --- | --- |
| Endpoint Format Id | Persistent POA FQPN | object_id |
| 33 31 | (ASCII) retain_poa | (ASCII) my_persistent_object\0 |

Although the preferred embodiments of the invention have been described in the foregoing description, it will be understood that the present invention is not limited to the specific embodiments described above.

What is claimed is:

1. A computer implemented method of creating and managing one or more interceptors, comprising:

intrinsically chaining the interceptors so that at least one of the one or more interceptors is configured to directly call a next interceptor in a chain; and storing state information, in at least one of the chained interceptors, directed to a reference to the next interceptor; and splitting, in a server, the chained interceptors into a first and a second interceptor chains;

wherein the first interceptor chain is a per-client interceptor chain; and the second interceptor chain is one of a per-endpoint and a per-object interceptor chain.

2. A server computer in a client-server environment, comprising:

a processor configured to generate one or more interceptors and to intrinsically chain the interceptors so that at least one of the one or more interceptors is configured to directly call a next interceptor in a chain; and a memory associated with at least one of the chained interceptors and configured to store state information directed to a reference to the next interceptor thereof;

wherein the processor is further configured to split the chained interceptors into a first and a second interceptor chains, generate the first interceptor chain as a per-client interceptor chain, and generate the second interceptor chain as one of a per-endpoint and a per-object interceptor chain.

3. A computer implemented method of creating and managing one or more interceptors, comprising:

intrinsically chaining the interceptors; and storing state information in at least one of the chained interceptors directed to a reference to the next interceptor;

wherein the interceptor chain is a per-endpoint interceptor chain.

4. A computer implemented method of creating and managing one or more interceptors used by an application, comprising:

providing one or more interceptors;

providing a basis for the application to trust the one or more interceptors;

intrinsically chaining the interceptors so that at least one of the one or more interceptors is configured to directly call a next interceptor in a chain; and storing state information, in at least one of the chained interceptors, directed to a reference to the next interceptor.

* * * * *